United States Patent
Shimura et al.

(10) Patent No.: US 12,119,468 B2
(45) Date of Patent: Oct. 15, 2024

(54) SOLID-STATE BATTERY HAVING A HEAT RECEIVING MEMBER EMBEDDED IN AN INSULATING COATING, BATTERY MODULE, AND CHARGING METHOD OF SOLID-STATE BATTERY

(71) Applicant: Murata Manufacturing Co., Ltd., Nagaokakyo (JP)

(72) Inventors: Jusuke Shimura, Nagaokakyo (JP); Noriyuki Aoki, Nagaokakyo (JP); Tomohiro Kato, Nagaokakyo (JP)

(73) Assignee: MURATA MANUFACTURING CO., LTD., Nagaokakyo (JP)

(*) Notice: Subject to any disclaimer, the term of this patent is extended or adjusted under 35 U.S.C. 154(b) by 886 days.

(21) Appl. No.: 17/096,075

(22) Filed: Nov. 12, 2020

(65) Prior Publication Data

US 2021/0066771 A1 Mar. 4, 2021

Related U.S. Application Data

(63) Continuation of application No. PCT/JP2019/018392, filed on May 8, 2019.

(30) Foreign Application Priority Data

May 15, 2018 (JP) ................... 2018-093869

(51) Int. Cl.
*H01M 10/655* (2014.01)
*H01M 10/0562* (2010.01)
(Continued)

(52) U.S. Cl.
CPC ..... *H01M 10/655* (2015.04); *H01M 10/0562* (2013.01); *H01M 10/0585* (2013.01);
(Continued)

(58) Field of Classification Search
CPC ........... H01M 10/6571; H01M 10/615; H01M 10/655; H01M 10/0585; H01M 10/443;
(Continued)

(56) References Cited

U.S. PATENT DOCUMENTS

2009/0311584 A1* 12/2009 Yamazaki ......... H01M 10/0525
429/93
2013/0252040 A1* 9/2013 Kwak ................. H01M 10/647
429/62

(Continued)

FOREIGN PATENT DOCUMENTS

JP    H0410366 A    1/1992
JP    2006066083 A  3/2006
(Continued)

OTHER PUBLICATIONS

Japanese Office Action issued for corresponding Japanese Patent Application No. 2020-519585, dispatch date of JP Office Action Jan. 11, 2022.

(Continued)

*Primary Examiner* — Edward Tso
*Assistant Examiner* — Aaron Piggush
(74) *Attorney, Agent, or Firm* — ArentFox Schiff LLP

(57) ABSTRACT

Disclosed herein is a solid-state battery includes a battery element including alternating positive electrode layers and negative electrode layers each separated by a respective solid electrolyte layer interposed in between; a positive electrode terminal that is attached to the battery element to be electrically connected to the positive electrode layers and electrically separated from the negative electrode layers; a negative electrode terminal that is attached to the battery element to be electrically connected to the negative electrode layers and electrically separated from the positive electrode layers; an insulating coating that covers the battery (Continued)

element, wherein a respective portion of each of the positive electrode terminal and the negative electrode terminal lead out of the covered battery element; and a heat receiving member that is attached to the insulating coating so as to be electrically separated from both the positive electrode terminal and the negative electrode terminal.

18 Claims, 14 Drawing Sheets

(51) Int. Cl.
| | |
|---|---|
| *H01M 10/0585* | (2010.01) |
| *H01M 10/44* | (2006.01) |
| *H01M 10/48* | (2006.01) |
| *H01M 10/615* | (2014.01) |
| *H01M 10/6571* | (2014.01) |
| *H01M 50/116* | (2021.01) |
| *H01M 50/24* | (2021.01) |
| *H02J 7/00* | (2006.01) |
| *H01M 50/247* | (2021.01) |

(52) U.S. Cl.
CPC ......... *H01M 10/443* (2013.01); *H01M 10/48* (2013.01); *H01M 10/615* (2015.04); *H01M 10/6571* (2015.04); *H01M 50/116* (2021.01); *H01M 50/24* (2021.01); *H02J 7/007194* (2020.01); *H01M 50/247* (2021.01); *H02J 7/007182* (2020.01)

(58) Field of Classification Search
CPC ............. H01M 10/48; H01M 10/0562; H01M 50/116; H01M 50/24; H01M 50/247; H02J 7/007194; H02J 7/007182

USPC ...................... 320/107, 112, 150; 429/62, 93
See application file for complete search history.

(56) References Cited

U.S. PATENT DOCUMENTS

| | | | |
|---|---|---|---|
| 2013/0295430 A1* | 11/2013 | Kurahashi | H01M 10/0525 |
| | | | 429/120 |
| 2016/0028128 A1 | 1/2016 | Limvorapun | |
| 2019/0044201 A1* | 2/2019 | Jo | H01M 50/627 |
| 2021/0119250 A1* | 4/2021 | Taniuchi | H01M 10/657 |

FOREIGN PATENT DOCUMENTS

| | | |
|---|---|---|
| JP | 2008258882 A | 10/2008 |
| JP | 2011238428 A | 11/2011 |
| JP | 2012109045 A | 6/2012 |
| JP | 2013187040 A | 9/2013 |
| JP | 2014082663 A | 5/2014 |
| JP | 2014207723 A | 10/2014 |
| JP | 5804053 B2 | 11/2015 |
| JP | 2016029643 A | 3/2016 |
| JP | 2016219224 A | 12/2016 |
| WO | 2012141231 A1 | 10/2012 |

OTHER PUBLICATIONS

International Search Report Issued for PCT/JP2019/018392, date of mailing Aug. 6, 2019.
Written Opinion of the International Searching Authority issued for PCT/JP2019/018392, date of mailing Aug. 6, 2019.

* cited by examiner

SOLID-STATE BATTERY HAVING A HEAT RECEIVING MEMBER EMBEDDED IN AN INSULATING COATING, BATTERY MODULE, AND CHARGING METHOD OF SOLID-STATE BATTERY

CROSS-REFERENCE TO RELATED APPLICATIONS

The present application is a continuation of International Application No. PCT/JP2019/018392, filed on May 8, 2019, which claims priority to Japanese Application No. 2018-093869, filed on May 15, 2018, the entire contents of each of which are incorporated herein by reference.

TECHNICAL FIELD

The present technology relates to solid-state batteries, a charging method thereof, and a battery module using the solid-state battery.

BACKGROUND

Various electronic devices such as mobile phones have widespread usage throughout the world. There is a demand for miniaturization, weight reduction, and longer life of these electronic devices. Therefore, a battery that can be used repeatedly and efficiently as a power supply is being actively developed.

In particular, a solid-state battery that uses a solid-state electrolyte is attracting attention over a liquid battery that uses a liquid-state electrolyte. This is because a solid-state battery does not have a risk of liquid leakage that is specific to the liquid battery.

A solid-state battery includes a solid electrolyte layer together with a positive electrode layer and a negative electrode layer. Since the configuration of the solid-state battery has a great influence on charging characteristics, various studies have been made on the configuration of the solid-state battery. Nonetheless, the charging characteristics of the solid-state battery are not yet sufficient and there is room for improvement. Moreover, due to the increasing demand for quick charging, it is important to easily realize quick charging.

SUMMARY

The present technology has been made in view of such problems, and an object of the present invention is to provide a solid-state battery, a charging method thereof, and a battery module which can easily improve charging characteristics.

A solid-state battery according to an embodiment of the present disclosure includes a battery element including alternating positive electrode layers and negative electrode layers each separated by a respective solid electrolyte layer interposed in between; a positive electrode terminal that is attached to the battery element to be electrically connected to the positive electrode layers and electrically separated from the negative electrode layers; a negative electrode terminal that is attached to the battery element to be electrically connected to the negative electrode layers and electrically separated from the positive electrode layers; an insulating coating that covers the battery element, wherein a respective portion of each of the positive electrode terminal and the negative electrode terminal lead out of the covered battery element; and a heat receiving member that is attached to the insulating coating so as to be electrically separated from both the positive electrode terminal and the negative electrode terminal, wherein a thermal conductivity of the heat receiving member is higher than a thermal conductivity of the insulating coating.

A battery module according to an embodiment of the present disclosure includes a support; a solid-state battery arranged on the support; a heating source which is arranged on the support at a position different from a position where the solid-state battery is arranged; and a heat transfer member which is arranged on the support, and thermally connects the solid-state battery and the heating source, wherein the solid-state battery has the same configuration as the solid-state battery according to the embodiment of the present disclosure described above.

A charging method of a solid-state battery according to an embodiment of the present disclosure includes heating a solid-state battery; measuring a heating attribute of the solid-state battery; determining whether the heating attribute of the solid-state battery meets a charging prerequisite for initiating charging the solid-state battery; and in response to determining that the heat attribute meets the charging prerequisite, charging the solid-state battery.

In some aspects, the heating attribute is a temperature and the charging prerequisite is for the temperature to match a predetermined temperature appropriate for charging the solid-state battery. In other aspects, the heating attribute is a heating time and the charging prerequisite is for the heating time to match a predetermined heating time appropriate for charging the solid-state battery.

Still another charging method of a solid-state battery according to an embodiment of the present disclosure includes charging the solid-state battery; measuring an electrical attribute of the solid-state battery; determining whether the electrical attribute meets a heating prerequisite for initiating heating of the solid-state battery; and in response to determining that the electrical attribute meets the heating prerequisite, heating the solid-state battery.

In some aspects, the electrical attribute is a charge rate and the heating prerequisite is for the charge rate to match a predetermined charge rate appropriate for heating the solid-state battery. In other aspects, the electrical attribute is a voltage and the heating prerequisite is for the voltage to match a predetermined voltage appropriate for heating the solid-state battery.

With the solid-state battery of the embodiment of the present disclosure, since the heat receiving member is attached to the insulating coating so as to be electrically separated from each of the positive electrode terminal and the negative electrode terminal and the thermal conductivity of the heat receiving member is higher than the thermal conductivity of the insulating coating, it is possible to easily improve the charging characteristics of the battery module using the solid-state battery.

With the battery module of the embodiment of the present disclosure, since the solid-state battery and the heating source are arranged on the support and the solid-state battery and the heating source are thermally connected to each other via the heat transfer member, it is possible to easily improve the charging characteristics.

With the charging method of the solid-state battery of the embodiment of the present disclosure, after the solid-state battery is heated, the solid-state battery is charged on the basis of the temperature of the solid-state battery or the solid-state battery is charged on the basis of the heating time of the solid-state battery, and therefore, it is possible to easily improve the charging characteristics.

With the other charging method of the solid-state battery of the embodiment of the present disclosure, after the solid-state battery is charged, the solid-state battery is heated on the basis of the charge rate of the solid-state battery or the solid-state battery is heated on the basis of the voltage of the solid-state battery, and therefore, it is possible to easily improve the charging characteristics.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Hereinafter, an embodiment of the present technology will be described in detail with reference to the drawings. The order of description is as follows.
1. Battery Module (Solid-State Battery)
   1-1. Overall Configuration
   1-2. Configuration of Solid-State Battery
   1-3. Block Configuration
   1-4. Operation (Charging Method of Solid-State Battery)
   1-5. Manufacturing Method
   1-6. Action and Effect
2. Example
3. Application for Battery Module (Solid-State Battery)

Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

1. Battery Module (Solid-State Battery)

A battery module of an embodiment of the present technology will be described.

Since the solid-state battery of an embodiment of the present technology is a part of the battery module described here, the solid-state battery will be described below.

The battery module includes a solid-state battery 200 (refer to FIGS. 2 to 4 described later) and is used as a power supply in various applications. The solid-state battery 200 is a battery using a solid electrolyte, and is a so-called all-solid-state battery. In the solid-state battery 200, a battery capacity can be obtained by utilizing the occlusion phenomenon of the electrode reactant and the release phenomenon of the electrode reactant.

The electrode reactant is a substance involved in the electrode reaction (so-called charge/discharge reaction). The type of electrode reactant is not particularly limited, but is, for example, an alkali metal. In the following example, a case where the electrode reactant is lithium will be described.

As for one specific example (plurality of candidates for materials, forming method, and the like) described as appropriate below, only any one type may be used, or any two or more types may be combined with each other.

<1-1. Overall Configuration>

Figure 1:
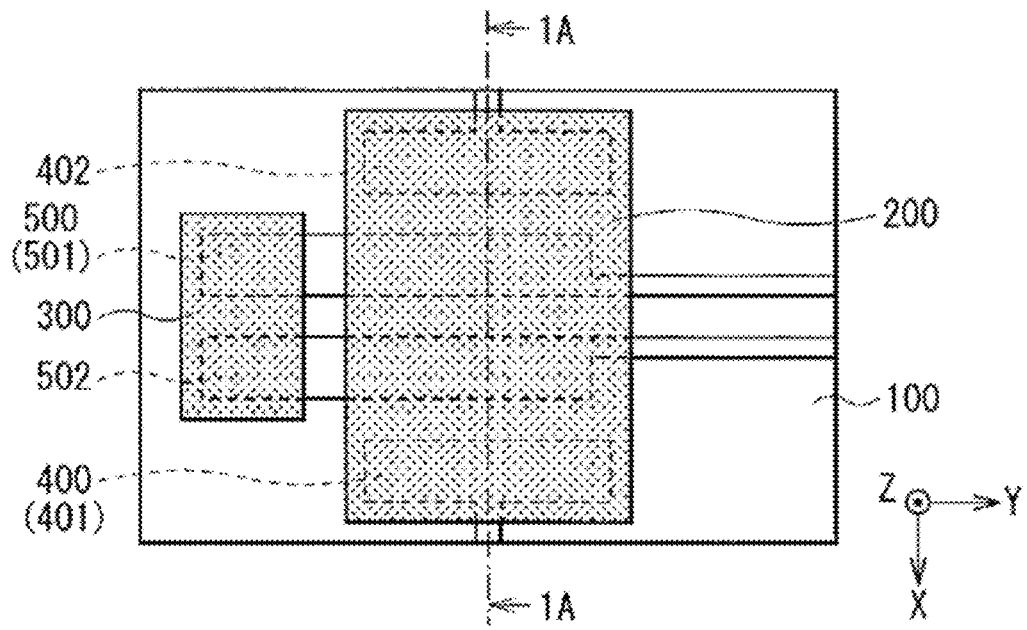
FIG. 1 is a plan view illustrating a configuration of a battery module of an embodiment of the present technology.

FIG. 1 illustrates a planar configuration of a battery module. However, in FIG. 1, the illustrated contents of the solid-state battery 200 are simplified.

For example, as illustrated in FIG. 1, the battery module includes the solid-state battery 200, a heater 300, wiring 400, and a heat transfer wire 500 on a substrate 100. In FIG. 1, each of the solid-state battery 200 and the heater 300 is shaded.

[Substrate 100]

The substrate 100 is a support that supports the solid-state battery 200, the heater 300, and the like. The substrate 100 is, for example, a so-called printed circuit board. Therefore, each of the solid-state battery 200, the heater 300, the wiring 400, and the heat transfer wire 500 is mounted on one surface of the substrate 100 by using, for example, surface mount technology.

[Solid-State Battery]

The solid-state battery 200 is a main part (so-called power supply) of the battery module and is arranged on the substrate 100. As will be described later, the solid-state battery 200 includes a heat receiving pad 250 (refer to FIGS. 2 to 4) for receiving heat generated in the heater 300. The detailed configuration of the solid-state battery 200 will be described later (refer to FIGS. 2 to 4).

[Heater]

The heater 300 is a heating source for heating the solid-state battery 200. The heater 300 is provided on the substrate 100 separately from the solid-state battery 200, that is, the heater 300 is arranged on the substrate 100 at a position different from a position where the solid-state battery 200 is arranged.

In particular, the heater 300 generates heat by itself, and utilizes the heat generated during the heat generation to heat the solid-state battery 200. The heater 300 includes heaters such as chip resistors and positive characteristic (PTC) thermistors, for example. This is because the heater 300 can be easily mounted on the substrate 100 and the heater 300 can sufficiently heat the solid-state battery 200.

A chip resistor is an electric component that generates heat by utilizing electrical resistance. The chip resistor is, for example, a surface-mount high power chip resistor. A PTC thermistor is an electric component that generates heat by utilizing the characteristic that the electrical resistance increases above a certain temperature. Specifically, the PTC thermistor is, for example, a POSISTOR™ FTP series manufactured by Murata Manufacturing Co., Ltd.

[Wiring]

The wiring 400 is an energizing member (e.g., electric wiring) for energizing the solid-state battery 200, and is arranged on the substrate 100. The wiring 400 includes, for example, a conductive material such as copper.

Specifically, the battery module includes, for example, two pieces of wiring 400 (positive electrode wiring 401 and negative electrode wiring 402) for operating the solid-state battery 200. Each of the positive electrode wiring 401 and the negative electrode wiring 402 is separated from each other in an X-axis direction and extends in the X-axis direction, for example. The positive electrode wiring 401 is connected to, for example, a positive electrode terminal 220 (positive electrode terminal surface 220M), which will be described later, in the solid-state battery 200. The negative electrode wiring 402 is connected to, for example, a negative electrode terminal 230 (negative electrode terminal surface 230M), which will be described later, in the solid-state battery 200 (refer to FIGS. 3 and 4).

[Heat Transfer Wire]

The heat transfer wire 500 is a heat transfer member for thermally connecting the solid-state battery 200 and the heater 300 to each other, and is arranged on the substrate 100. The configuration of the heat transfer wire 500 is not particularly limited as long as the heat transfer wire 500 has thermal conductivity.

Here, the heat transfer wire 500 functions as, for example, a heat transfer member that transfers the heat generated in the heater 300 to the solid-state battery 200, and also functions as an energizing member (electric wiring) that energizes the heater 300. This is because the heat transfer wire 500 also serves as the electric wiring for energization of the heater 300, so that it is not necessary to install electric wiring for energization separately from the heat transfer wire 500. Further, this is because the heat transfer wire 500 can be easily mounted on the substrate 100 together with the solid-state battery 200 and the heater 300.

Specifically, the battery module includes, for example, two heat transfer wires 500 (positive electrode heat transfer wire 501 and negative electrode heat transfer wire 502). Each of the positive electrode heat transfer wire 501 and the negative electrode heat transfer wire 502 is separated from each other in the X-axis direction and extends in a Y-axis direction, for example.

The positive electrode heat transfer wire 501 is connected to a positive electrode (not illustrated) of the heater 300 in order to function as electric wiring for energization of the heater 300. The negative electrode heat transfer wire 502 is connected to a negative electrode (not illustrated) of the heater 300 in order to function as electric wiring for energization of the heater 300.

Further, the positive electrode heat transfer wire 501 is connected to a heat receiving pad 251 (heat receiving surface 251M), which will be described later, in the solid-state battery 200 in order to transfer the heat generated in the heater 300 to the solid-state battery 200. The negative electrode heat transfer wire 502 is connected to a heat receiving pad 252 (heat receiving surface 252M), which will be described later, in the solid-state battery 200 in order to transfer the heat generated in the heater 300 to the solid-state battery 200 (refer to FIGS. 2 to 4).

That is, each of the positive electrode heat transfer wire 501 and the negative electrode heat transfer wire 502 is utilized for energizing the heater 300, and is utilized for transferring the heat generated in the heater 300 to the solid-state battery 200. As a result, the heater 300 can heat the solid-state battery 200 via the heat receiving pads 251 and 252 together with the positive electrode heat transfer wire 501 and the negative electrode heat transfer wire 502.

Each of the positive electrode heat transfer wire 501 and the negative electrode heat transfer wire 502 may include, for example, a conductive material such as solder together with electric wiring such as a copper wire. The conductive material such as solder is used, for example, for fixing each of the positive electrode heat transfer wire 501 and the negative electrode heat transfer wire 502 to the substrate 200, and is used for connecting each of the positive electrode heat transfer wire 501 and the negative electrode heat transfer wire 502 to the solid-state battery 200 (heat receiving pads 251 and 252).

<1-2. Configuration of Solid-State Battery>

Figure 2:
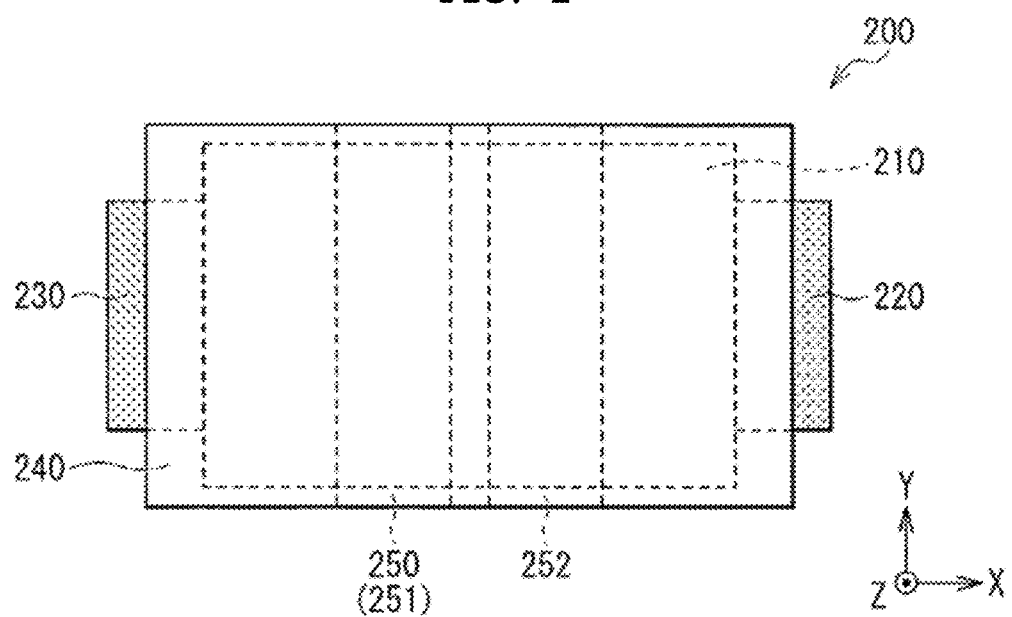
FIG. 2 is a plan view illustrating a configuration of a solid-state battery illustrated in FIG. 1.
Figure 3:
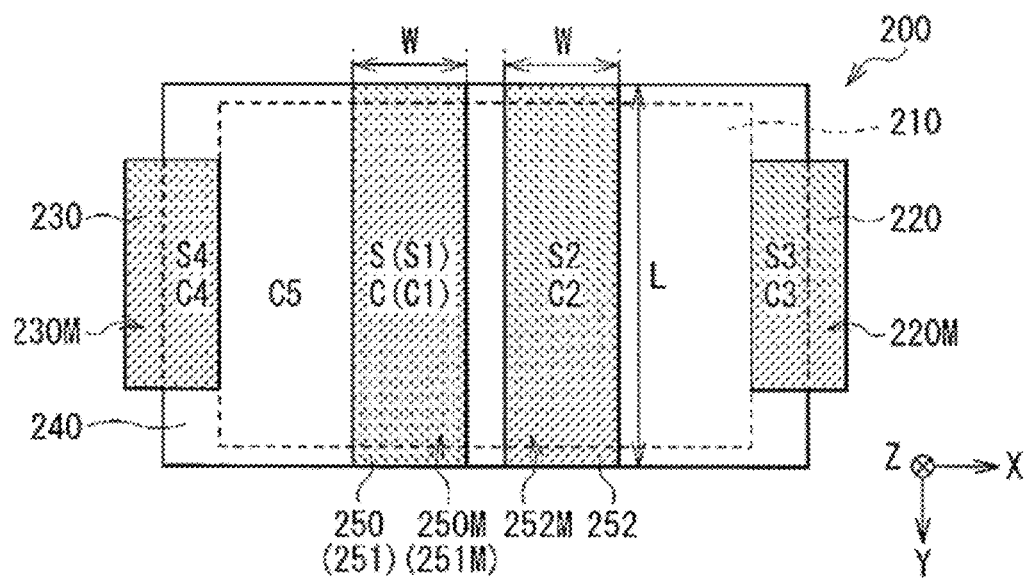
FIG. 3 is a plan view illustrating another configuration of the solid-state battery illustrated in FIG. 1.
Figure 4:
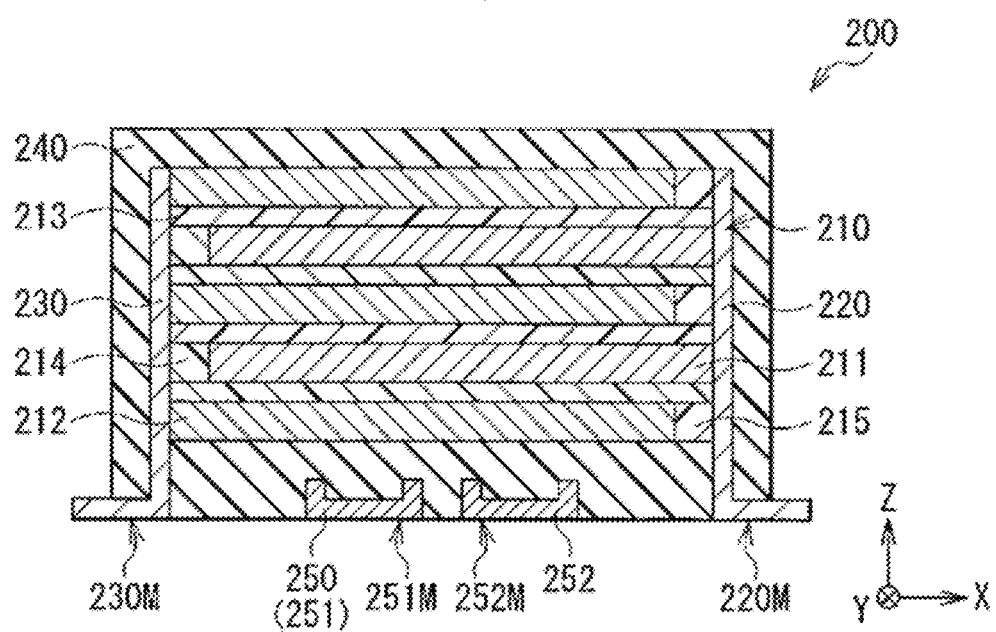
FIG. 4 is sectional view illustrating the configuration of the solid-state battery taken along line 1A-1A illustrated in FIG. 1.

FIGS. 2 and 3 each represent the planar configuration of the solid-state battery 200 illustrated in FIG. 1, and FIG. 4 represents the sectional configuration of the solid-state battery 200 along line 1A-1A illustrated in FIG. 1.

However, FIG. 2 illustrates a state where the solid-state battery 200 is viewed from above (side where the heat receiving pad 250 is not arranged), and FIG. 3 illustrates a state where the solid-state battery 200 is viewed from below (side where the heat receiving pad 250 is arranged).

The solid-state battery 200 includes, for example, a laminated body 210, the positive electrode terminal 220, the negative electrode terminal 230, a coating layer 240, and the heat receiving pad 250, as illustrated in FIGS. 2 to 4. In each of FIGS. 2 and 3, the positive electrode terminal 220, the negative electrode terminal 230, and the heat receiving pad 250 are shaded.

[Laminated Body]

The laminated body 210 is a battery element including a positive electrode layer 211, a negative electrode layer 212, and a solid electrolyte layer 213. The laminated body 210 is arranged between the positive electrode terminal 220 and the negative electrode terminal 230, and includes a plurality of layers laminated in a direction (Z-axis direction) intersecting with the direction (X-axis direction) in which the positive electrode terminal 220 and the negative electrode terminal 230 face each other. The plurality of layers are, for example, the positive electrode layer 211, the negative electrode layer 212, the solid electrolyte layer 213, a positive electrode separation layer 214, and a negative electrode separation layer 215.

Specifically, the laminated body 210 has, for example, a laminated structure in which the positive electrode layer 211 and the positive electrode separation layer 214, and the negative electrode layer 212 and the negative electrode separation layer 215 are alternately laminated with the solid electrolyte layer 213 interposed in between along the Z-axis direction. Therefore, the positive electrode layer 211 and the positive electrode separation layer 214 are separated from the negative electrode layer 212 and the negative electrode separation layer 215 with the solid electrolyte layer 213 interposed in between. Here, for example, the lowest layer of the laminated structure is the negative electrode layer 212 and the negative electrode separation layer 215, and the uppermost layer of the laminated structure is the negative electrode layer 212 and the negative electrode separation layer 215.

The number of laminated layers in the laminated body 210 (the number of each of the positive electrode layers 211, the negative electrode layers 212, and the solid electrolyte layers 213) is not particularly limited. FIG. 4 illustrates, for example, a case where the number of positive electrode layers 211 is two, the number of negative electrode layers 212 is three, and the number of solid electrolyte layers 213 is four, in order to simplify the illustrated contents.

The laminated body 210 may include, for example, another layer other than the series of layers described above. For example, the other layer is a protective layer or the like. The protective layer is, for example, the lowest layer of the laminated body 210 and the uppermost layer of the laminated body 210.

[Positive Electrode Layer]

The positive electrode layer 211 is electrically connected to the positive electrode terminal 220, and is electrically separated from the negative electrode terminal 230 with the positive electrode separation layer 214 interposed in between layer 211 and terminal 230.

The positive electrode layer 211 has, for example, a laminated structure in which a positive electrode current collector layer and a positive electrode active material layer are laminated in the Z-axis direction. In this case, for example, one positive electrode current collector layer and one positive electrode active material layer may be laminated on each other, or two positive electrode active material layers may be laminated with one positive electrode current collector layer interposed in between.

The positive electrode current collector layer includes, for example, a conductive material such as a carbon material and a metal material, and may further include a binder, a solid electrolyte, and the like. The positive electrode active material layer includes, for example, a positive electrode active material that can occlude lithium and release lithium, and may further include a binder, a conductive agent, a solid electrolyte, and the like. The positive electrode active material is, for example, a lithium compound, and the lithium compound is, for example, a composite oxide including lithium as a constituent element and a phosphoric acid compound including lithium as a constituent element. The configuration of the solid electrolyte is, for example, the same as the configuration of the solid electrolyte included in the solid electrolyte layer 213.

[Negative Electrode Layer]

The negative electrode layer 212 is electrically connected to the negative electrode terminal 230, and is electrically separated from the positive electrode terminal 220 with the negative electrode separation layer 215 interposed in between.

The negative electrode layer 212 has, for example, a laminated structure in which a negative electrode current collector layer and a negative electrode active material layer are laminated in the Z-axis direction. In this case, for example, one negative electrode current collector layer and one negative electrode active material layer may be laminated on each other, or two negative electrode active material layers may be laminated with one negative electrode current collector layer interposed in between.

The negative electrode current collector layer includes, for example, a conductive material such as a carbon material and a metal material, and may further include a binder, a solid electrolyte, and the like. The negative electrode active material layer includes, for example, a negative electrode active material that can occlude lithium and release lithium, and may further include a binder, a conductive agent, a solid electrolyte, and the like. The negative electrode active material is, for example, a carbon material, a metal-based material, a lithium compound, or the like. The carbon material is, for example, graphite. The metal-based material is, for example, a material including silicon as a constituent element. The lithium compound is, for example, a composite oxide including lithium as a constituent element. The configuration of the solid electrolyte is, for example, the same as the configuration of the solid electrolyte included in the solid electrolyte layer 213.

[Solid Electrolyte Layer]

The solid electrolyte layer 213 is a medium for moving lithium between the positive electrode layer 211 and the negative electrode layer 212, and is electrically connected to each of the positive electrode terminal 220 and the negative electrode terminal 230. The solid electrolyte layer 213 includes a solid electrolyte, and may further include a binder or the like. Examples of the solid electrolyte include a crystalline solid electrolyte and a glass-ceramic solid electrolyte.

[Positive Electrode Separation Layer and Negative Electrode Separation Layer]

Each of the positive electrode separation layer 214 and the negative electrode separation layer 215 has the same configuration as the solid electrolyte layer 213, for example.

[Positive Electrode Terminal and Negative Electrode Terminal]

The positive electrode terminal 220 is attached to one side surface (side where the negative electrode separation layer 215 is arranged) of the laminated body 210, and is electrically connected to the positive electrode layer 211. The positive electrode terminal 220 includes a conductive material such as silver, and has a thermal conductivity C3.

The positive electrode terminal 220 extends in the Z-axis direction along one side surface of the laminated body 210, and then is bent outward in the X-axis direction. Therefore, the outwardly bent portion of the positive electrode terminal 220 has, for example, the positive electrode terminal surface 220M along a predetermined surface (XY surface). The positive electrode terminal surface 220M is a connection surface connected to the positive electrode wiring 401, and has an area S3.

The negative electrode terminal 230 is attached to the other side surface (side where the positive electrode separation layer 214 is arranged) of the laminated body 210, and is separated from the positive electrode terminal 220. As a result, the negative electrode terminal 230 is electrically connected to the negative electrode layer 212. The negative electrode terminal 230 includes, for example, the same material as the material for forming the positive electrode terminal 220, and has a thermal conductivity C4.

The negative electrode terminal 230 extends in the Z-axis direction along the other side surface of the laminated body 210, and then is bent outward (direction opposite to the direction in which the positive electrode terminal 220 is bent) in the X-axis direction. Therefore, the outwardly bent portion of the negative electrode terminal 230 has, for example, the negative electrode terminal surface 230M along the XY surface. The negative electrode terminal surface 230M is a connection surface connected to the negative electrode wiring 402, and has an area S4.

[Coating Layer]

The coating layer 240 is an insulating coating that covers the periphery of the laminated body 210 in order to protect the laminated body 210 physically and chemically. However, each portion of the positive electrode terminal 220 and the negative electrode terminal 230 is led out from the inside of the coating layer 240 to the outside. That is, the coating layer 240 covers the laminated body 210 such that each of the positive electrode terminal 220 and the negative electrode terminal 230 is led out.

Since the coating layer 240 includes, for example, an insulating polymer material such as an epoxy resin, the coating layer 240 has an insulating property. However, the coating layer 240 may have, for example, a multilayer structure in which two or more layers are laminated from the inside to the outside. In this case, for example, two or more layers may be separated from each other with a barrier layer interposed in between.

The thermal conductivity of the coating layer 240 is not particularly limited, but is preferably as low as possible. This is because when heat is transferred from the heat receiving pad 250 to the laminated body 210, the heat is easily maintained in the laminated body 210, so that the laminated body 210 is easily heated efficiently. In this case, in order to improve the heat retention of the coating layer 240, the coating layer 240 may have a plurality of bubbles (voids) inside.

The color of the coating layer 240 is not particularly limited, but is preferably a color having a small heat radiation coefficient. This is because the heat is easily maintained in the laminated body 210, so that the laminated body 210 is easily heated efficiently. Specifically, the color of the coating layer 240 is preferably a light color than a dark color, and is more specifically, white than black.

Along with this, the surface shape of the coating layer 240 is preferably as smooth as possible. This is because, as described above, since the heat radiation coefficient becomes small, it becomes difficult for heat to be radiated from the inside of the coating layer 240 to the outside. Specifically, it is preferable that the surface of the coating layer 240 is smoothed rather than surface-textured.

[Heat Receiving Pad]

The heat receiving pad 250 is a heat receiving member that receives the heat transferred from the heater 300 via the heat transfer wire 500, and is attached to the laminated body 210. As a result, the heat receiving pad 250 receives the heat supplied from the heater 300, and utilizes the heat to heat the laminated body 210.

Since the heat receiving pad 250 is separated from each of the positive electrode terminal 220 and the negative electrode terminal 230, the heat receiving pad 250 is electrically separated from each of the positive electrode terminal 220 and the negative electrode terminal 230. However, as described above, the heat receiving pad 250 is thermally connected to the laminated body 210 in order to heat the laminated body 210, and in particular, the heat receiving pad 250 has a thermal conductivity C higher than a thermal conductivity C5 of the coating layer 240. This is because the amount of heat received by the heat receiving pad 250 is larger than the amount of heat released from the coating layer 240. As a result, the laminated body 210 can be easily heated efficiently by utilizing the heat received by the heat receiving pad 250.

Further, the heat receiving pad 250 is attached to the coating layer 240, and more specifically, the heat receiving pad 250 is attached to the lower surface of the coating layer 240 (surface on a side where each of the positive electrode terminal 220 and the negative electrode terminal 230 is bent). Since the heat receiving pad 250 is embedded in the coating layer 240 so as to be partially exposed, the heat receiving pad 250 is separated from the laminated body 210 with the coating layer 240 interposed in between. As a result, the exposed portion of the heat receiving pad 250 has an exposed surface (heat receiving surface) 250M along the XY surface, and the heat receiving surface 250M has an area S.

The material for forming the heat receiving pad 250 is not particularly limited as long as the material has thermal conductivity (the above-mentioned thermal conductivity C). Therefore, the heat receiving pad 250 may have conductivity or an insulating property.

In a case where the heat receiving pad 250 has conductivity, as will be described later, in the manufacturing process of the solid-state battery 200, the positive electrode terminal 220, the negative electrode terminal 230, and the heat receiving pad 250 can be collectively formed by using a conductive frame 700. In this case, since a conductive heat receiving pad 250 is separated from the laminated body 210 with an insulating coating layer 240 interposed in between, even if the heat receiving pad 250 has conductivity, the laminated body 210 is less likely to be electrically affected by the heat receiving pad 250.

In a case where the heat receiving pad 250 has an insulating property, the heat receiving pad 250 is electrically separated from each of the positive electrode terminal 220 and the negative electrode terminal 230. Therefore, an unintended short circuit of the solid-state battery 200 due to the presence of the heat receiving pad 250 is less likely to occur.

The conductive heat receiving pad 250 includes, for example, a conductive material such as copper, aluminum, and various alloys. The type of alloy is not particularly limited, but is, for example, a nickel iron alloy (42 alloy). Above all, the conductive material is preferably a low thermal expansion alloy such as a nickel iron alloy (42 alloy). This is because the coefficient of thermal expansion of the low thermal expansion alloy is as low as the coefficient of thermal expansion of ceramics, so that the heat receiving pad 250 is less likely to undergo thermal expansion.

It is preferable that the solder wettability of the conductive heat receiving pad 250 is high. This is because when the heat receiving pad 250 is connected to the heat transfer wire 500 by using solder, the surface of the heat receiving pad 250 and the surface of the heat transfer wire 500 are each covered with the solder without any gaps. As a result, the heat receiving pad 250 and the heat transfer wire 500 are easily brought into close contact with each other, so that the heat receiving pad 250 can easily receive heat efficiently via the heat transfer wire 500.

The solder wettability can be determined by using, for example, the methods specified in JIS J 8615, JIS H 8618, ISO 2093, and the like. Regarding the solder wettability described here, the fact that the solder wettability is high means that the heat receiving surface 250M of the heat receiving pad 250 is determined to be "having wettability" on the basis of the determination criteria in the above-mentioned determination methods. Specifically, in a case where the heat receiving surface 250M of the heat receiving pad 250 is immersed in a solder bath (temperature=250° C.±5° C.) for 3 seconds, when the solder adheres evenly to the heat receiving surface 250M without unevenness, the heat receiving surface 250M is determined to be "having wettability".

A case where "no wettability" is determined on the basis of the determination criteria in the above-mentioned determination methods is, for example, a series of cases described below. First, there is a case where humps, black spots, and the like are generated on the heat receiving surface 250M to which the solder is attached. Secondly, there is a case where the scaly solder is blown off or the solder is peeled off by the bending test of the heat receiving pad 250. Thirdly, there is a case where the heat receiving surface 250M was exposed since the solder did not adhere to the heat receiving surface 250M.

The insulating heat receiving pad 250 includes, for example, an insulating material such as aluminum oxide (alumina), aluminum nitride, silicon carbide, and mica. The coefficient of thermal expansion of the insulating material is preferably sufficiently low, similar to the coefficient of thermal expansion of the conductive material described above.

Here, for example, as described above, heat is transferred from the heater 300 to the heat receiving pad 250 via two heat transfer wires 500 (positive electrode heat transfer wire 501 and negative electrode heat transfer wire 502). In this case, the solid-state battery 200 includes, for example, two heat receiving pads 250 (251, 252). The heat receiving pad 251 has a thermal conductivity C (C1), and the heat receiving pad 252 has a thermal conductivity C (C2). As a result, the thermal conductivity C1 of the heat receiving pad 251 is higher than the thermal conductivity C5 of the coating layer 240. Further, the thermal conductivity C2 of the heat receiving pad 252 is higher than the thermal conductivity C5 of the coating layer 240.

The heat receiving pads 251 and 252 are separated from each other in the X-axis direction, and extend in the same direction as the extending direction (Y-axis direction) of each of the positive electrode heat transfer wire 501 and the negative electrode heat transfer wire 502. The width W (dimension in the X-axis direction) and the length L (dimension in the Y-axis direction) of the heat receiving pads 251 and 252 are not particularly limited, and can be set arbitrarily.

Since the heat receiving pad 251 is arranged at a position corresponding to the positive electrode heat transfer wire 501, for example, the heat receiving pad 251 is connected to the positive electrode heat transfer wire 501. Since the heat receiving pad 252 is arranged at a position corresponding to the negative electrode heat transfer wire 502, for example, the heat receiving pad 252 is connected to the negative electrode heat transfer wire 502. As a result, the heat generated in the heater 300 is transferred to the heat receiving pad 251 via the positive electrode heat transfer wire 501 and to the heat receiving pad 252 via the negative electrode heat transfer wire 502.

Since the heat receiving pad 251 is partially exposed from the coating layer 240 as described above, the exposed portion of the heat receiving pad 251 has the heat receiving surface 251M along the XY surface. The heat receiving surface 251M is a connection surface connected to the positive electrode heat transfer wire 501, and has an area S1.

Since the heat receiving pad 252 is partially exposed from the coating layer 240 as described above, the exposed portion of the heat receiving pad 252 has the heat receiving surface 252M along the XY surface. The heat receiving surface 252M is a connection surface connected to the negative electrode heat transfer wire 502, and has an area S2.

Here, in order to facilitate heating of the laminated body 210 by utilizing the heat transferred from the heater 300 to the heat receiving pad 250 (251, 252) via the heat transfer wire 500 (positive electrode heat transfer wire 501 and negative electrode heat transfer wire 502), regarding the physical properties of the heat receiving pad 250, it is preferable that the following conditions are satisfied.

First, the thermal conductivity C1 of the heat receiving pad 251 is, for example, equal to or higher than the thermal conductivity C3 of the positive electrode terminal 220 and equal to or higher than the thermal conductivity C4 of the negative electrode terminal 230. Similarly, the thermal conductivity C2 of the heat receiving pad 252 is, for example, equal to or higher than the thermal conductivity C3 of the positive electrode terminal 220 and equal to or higher than the thermal conductivity C4 of the negative electrode terminal 230. This is because the amount of heat received by each of the heat receiving pads 251 and 252 is guaranteed. As a result, the laminated body 210 can be easily heated efficiently by utilizing the heat received by the heat receiving pads 251 and 252.

Above all, the thermal conductivity C1 is preferably higher than the thermal conductivity C3, and is preferably higher than the thermal conductivity C4. Similarly, it is preferable that the thermal conductivity C2 is higher than the thermal conductivity C3 and is higher than the thermal conductivity C4. This is because the amount of heat received by each of the heat receiving pads 251 and 252 is larger than the amount of heat released from each of the positive electrode terminal 220 and the negative electrode terminal 230. As a result, the laminated body 210 can be easily heated more efficiently by utilizing the heat received by the heat receiving pads 251 and 252.

Secondly, the area S of the heat receiving surface 250M of the heat receiving pad 250, that is, the sum (=S1+S2) of the area S1 of the heat receiving surface 251M of the heat receiving pad 251 and the area S2 of the heat receiving surface 252M of the heat receiving pad 252 is, for example, larger than the sum (=S3+S4) of the area S3 of the positive electrode terminal surface 220M of the positive electrode terminal 220 and the area S4 of the negative electrode terminal surface 230M of the negative electrode terminal 230. This is because the area (heat receiving area) where heat is received by each of the heat receiving pads 251 and 252 is larger than the area (heat radiation area) where heat is released from each of the positive electrode terminal 220 and the negative electrode terminal 230. As a result, the laminated body 210 can be easily heated efficiently by utilizing the heat received by the heat receiving pads 251 and 252.

The three-dimensional shape of the heat receiving pads 251 and 252 is not particularly limited. Here, for example, as illustrated in FIG. 4, the heat receiving pad 251 extends in the X-axis direction, and each of one end and the other end of the heat receiving pad 251 in the X-axis direction is bent toward the laminated body 210. The three-dimensional shape of the heat receiving pad 252 is, for example, the same as the three-dimensional shape of the heat receiving pad 251 described above.

However, each of one end and the other end of the heat receiving pad 251 may not be bent toward the laminated body 210, for example. That is, the heat receiving pad 251 may extend in the X-axis direction without being bent, for example. What has been described here is the same for, for example, the heat receiving pad 252.

It is preferable that a heat conductive paste is interposed between the heat receiving pad 250 (251, 252) and the heat transfer wire 500. This is because the heat receiving pad 250 and the heat transfer wire 500 are in close contact with each other with the heat conductive paste interposed in between without any gap. As a result, the heat conduction state between the heat receiving pad 250 and the heat transfer wire 500 is less likely to be disturbed due to air contamination or the like, so that the heat receiving pad 250 can easily receive heat via the heat transfer wire 500.

In a case where the conductive heat receiving pad 250 is used, for example, any one or two or more of solder, metal paste, and the like can be used as the heat conductive paste. In a case where the insulating heat receiving pad 250 is used, for example, silicon oil including particles such as aluminum oxide, aluminum nitride, silicon carbide, and mica can be used as the heat conductive paste.

<1-3. Block Configuration>

Figure 5:
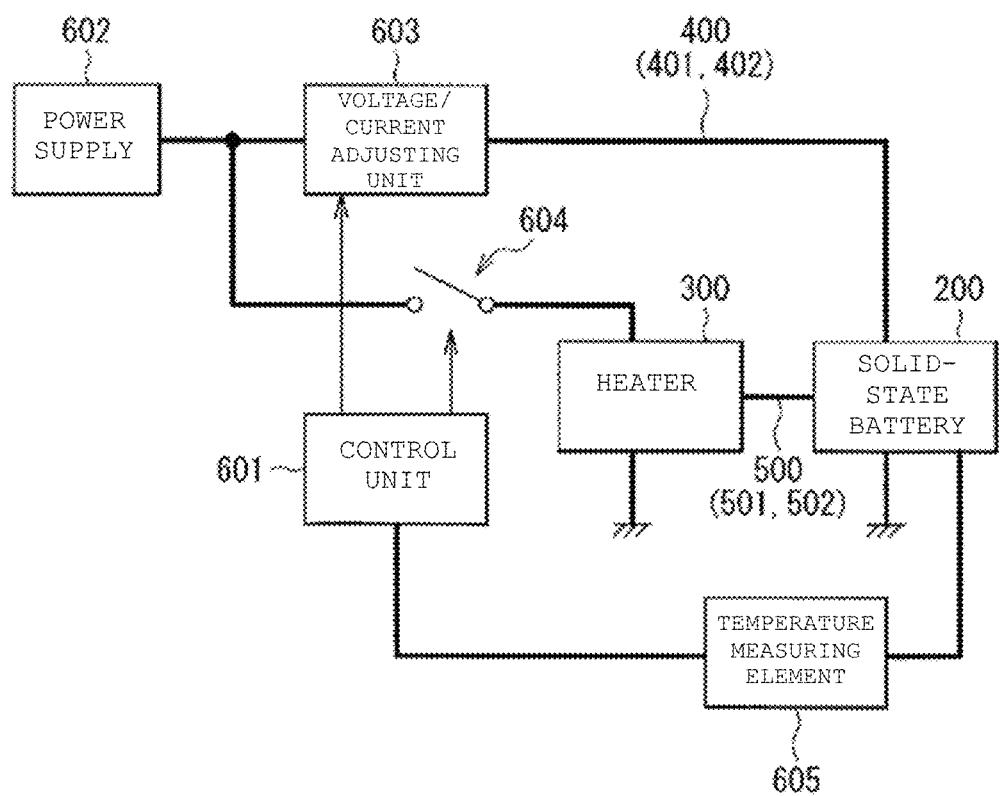
FIG. 5 is a block diagram illustrating the configuration of the battery module illustrated in FIG. 1.

FIG. 5 illustrates the block configuration of the battery module illustrated in FIG. 1. In FIG. 5, some of the constituents of the battery module already described are also illustrated.

As illustrated in FIG. 5, the battery module includes, for example, a control unit 601, a power supply 602, a voltage/current adjusting unit 603, a switch 604, and a temperature measuring element 605 together with the solid-state battery 200, the heater 300, the wiring 400 (positive electrode wiring 401 and negative electrode wiring 402), and the heat transfer wire 500 (positive electrode heat transfer wire 501 and negative electrode heat transfer wire 502) which are described above.

The power supply 602 is connected to the solid-state battery 200 via the voltage/current adjusting unit 603, and is connected to the heater 300 via the switch 604, for example. The solid-state battery 200 is connected to the control unit 601 via the temperature measuring element 605, for example.

[Control Unit]

The control unit 601 controls the overall operation of the battery module. The control unit 601 is, for example, an integrated circuit including electronic components such as a central processing unit (CPU), a memory, an input/output port, and a timer. Specifically, the control unit 601 controls the charging operation of the solid-state battery 200 via the voltage/current adjusting unit 603, and switches between allowing and not allowing the operation of the heater 300 via the switch 604.

[Power Supply]

The power supply 602 is used to charge the solid-state battery 200, and is used to operate (heat) the heater 300. The power supply 602 includes a constant voltage power supply such as an AC adapter.

[Voltage/Current Adjusting Unit]

The voltage/current adjusting unit 603 controls the charging operation of the solid-state battery 200, and particularly controls a constant current charging operation (CC) and a constant voltage charging operation (CV). The voltage/current adjusting unit 603 is, for example, an integrated circuit for CC/CV charging control.

Although the control unit 601 and the voltage/current adjusting unit 603 are separated from each other in FIG. 5, for example, the control unit 601 and the voltage/current adjusting unit 603 may be integrated with each other. That is, for example, the control unit 601 may also serve as the voltage/current adjusting unit 603 without using the voltage/current adjusting unit 603.

[Switch]

The switch 604 switches the operation (ON/OFF) of the heater 300. The switch 604 includes, for example, a switching element such as a field effect transistor (FET).

[Temperature Measuring Element]

The temperature measuring element 605 measures a temperature T of the solid-state battery 200, and outputs the measurement result of the temperature T to the control unit 601. The temperature measuring element 605 includes, for example, a temperature sensor such as a thermistor. The installation location of the temperature measuring element 60 is not particularly limited as long as the temperature measuring element 60 can measure the temperature T of the solid-state battery 200. Here, the temperature measuring element 605 is installed, for example, on the lower surface (surface on a side where the heat receiving pad 250 is arranged) of the solid-state battery 200, in a region where the heat receiving pad 250 is not present.

<1-4. Operation (Charging Method of Solid-State Battery)>

Figure 6:
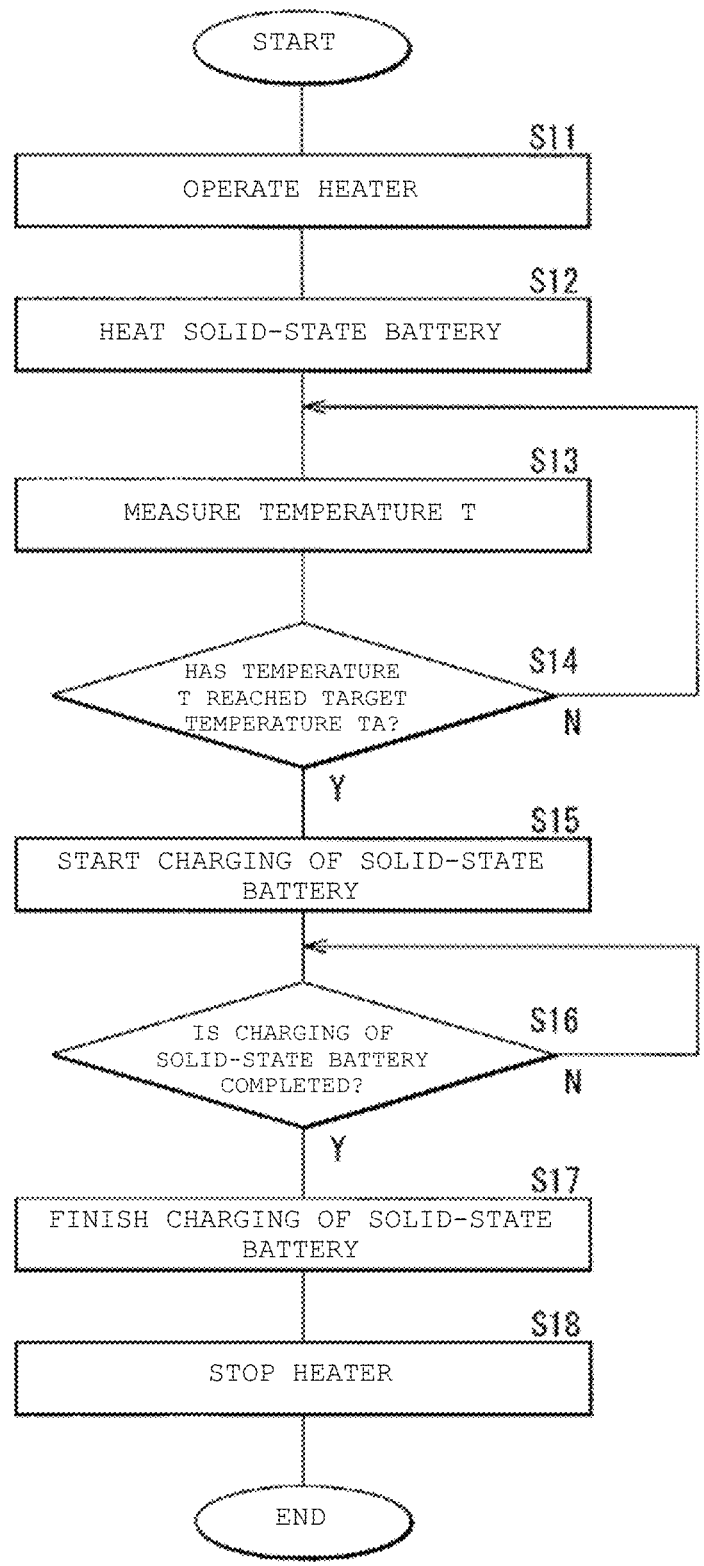
FIG. 6 is a flowchart for describing an operation of the battery module of the embodiment of the present technology.

FIG. 6 is a flow chart illustrating the operation of the battery module illustrated in FIGS. 1 to 5. Here, the charging operation of the solid-state battery 200 will be described by describing the flow of the operation of the control unit 601 that controls the overall operation of the battery module. The step numbers in parentheses described below correspond to the step numbers illustrated in FIG. 6.

Since the charging method of the solid-state battery of an embodiment of the present technology is realized by the operation of the battery module described here, the charging method of the solid-state battery will also be described below.

In the battery module before performing a series of operations described below (initial state), for example, the temperature T of the solid-state battery 200 is lower than a target temperature TA because the solid-state battery 200 has not yet been heated by the heater 300.

In the battery module, the power supply 602 and the heater 300 are connected to each other via the switch 604. At step S11, the heater 300 is operated by using the power supply 602. At step S12, the heater 300 is used to heat the solid-state battery 200. In this case, when the heater 300 is operated, the heater 300 generates heat. As a result, the heat generated in the heater 300 is transferred to the heat receiving pad 250 (251, 252) via the heat transfer wire 500 (positive electrode heat transfer wire 501 and negative electrode heat transfer wire 502), so that the laminated body 210 is heated by the heat receiving pads 251 and 252.

At step S13 (after the heater 300 is operated), the temperature T of the solid-state battery 200 is measured via the temperature measuring element 605. In this case, the temperature T is measured at predetermined time intervals, for example, using the timer. In this case, the temperature is a heating attribute of the solid-state battery 200.

At step S14, a determination is made on whether the temperature T has reached the target temperature TA on the basis of the measurement result of the temperature T. In some aspects, the target temperature TA may be a predetermined value stored inside the memory. When the temperature T matches the target temperature TA, a charging prerequisite for initiating charging is satisfied.

In a case where the temperature T has not reached the target temperature TA, it is determined at step S14 that the temperature T has not been increased to the extent that charging of the solid-state battery 200 can be started. In response, the process returns to the measurement operation of the temperature T at step S13. In this case, the temperature T is measured again at the next measurement timing, and then the determination of the temperature T is performed again at step S14. Thus, the measurement operation of the temperature T at step S13 and the determination operation of the temperature T at step S14 are repeated until the temperature T reaches the target temperature TA.

In a case where the temperature T has reached the target temperature TA at step S14, it is determined that the temperature T has been increased to the extent that charging of the solid-state battery 200 can be started. At step S15, the charging of the solid-state battery 200 is started via the power supply 602 and the voltage/current adjusting unit 603. In this case, for example, after the solid-state battery 200 is charged until the voltage reaches a predetermined value (e.g., an upper limit voltage) at a constant current, the solid-state battery 200 is charged until the current reaches a predetermined value (e.g., a lower limit current) at that voltage. In the charging process of the solid-state battery 200, lithium is released from the positive electrode layer 211, and the lithium is occluded in the negative electrode layer 212 via the solid electrolyte layer 213.

Here, the above-mentioned target temperature TA is a temperature at which the time required for charging the solid-state battery 200 can be shortened as compared with a case where the solid-state battery 200 is charged at room temperature (temperature=23° C.), and is a higher temperature than room temperature. The specific target temperature TA is not particularly limited as long as the target temperature TA is a temperature that requires heating of the solid-state battery 200, and is, for example, 40° C. or higher. However, if the temperature of the solid-state battery 200 becomes too high, the characteristics of the solid electrolyte layer 213 and the like may deteriorate, and therefore, the target temperature TA is preferably 60° C. or lower.

At step S16, a determination is made on whether the charging of the solid-state battery 200 is completed. In this case, the determination operation of charging completion is repeated at predetermined time intervals, for example, using the timer.

Here, for example, whether the charging is completed is determined by measuring the current at the time of constant voltage charging via the voltage/current adjusting unit 603 and checking whether the current has reached the lower limit current. Specifically, in a case where the current at the time of constant voltage charging has not yet reached the lower limit current, it is determined that the charging of the solid-state battery 200 has not yet been completed, and in a case where the current at the time of constant voltage charging has already reached the lower limit current, it is determined that the charging of the solid-state battery 200 has already been completed.

In a case where the charging of the solid-state battery 200 is not completed, the determination on the charging completion is performed again at the next determination timing at step S16. On the other hand, in a case where the charging of the solid-state battery 200 is completed, at step S17, the charging of the solid-state battery 200 is finished via the voltage/current adjusting unit 603.

Finally, by disconnecting the switch 604, the power supply 602 and the heater 300 are separated from each other via the switch 604. As a result, the heater 300 is stopped at step S18. In this case, since the heat generation of the heater 300 is stopped, the heating of the laminated body 210 using the heat receiving pads 251 and 252 is finished.

As a result, the solid-state battery 200 is charged (constant voltage/constant current charging), so that the charging operation of the solid-state battery 200 is completed.

<1-5. Manufacturing Method>

Each of FIGS. 7A, 8A, 9A, 10A, and 11A represents a planar configuration corresponding to FIG. 2 in order to describe the manufacturing process of the battery module illustrated in FIGS. 1 to 4. Each of FIGS. 7B, 8B, 9B, 10B, and 11B represents a sectional configuration corresponding to FIG. 4 in order to describe the manufacturing process of the battery module illustrated in FIGS. 1 to 4.

Figure 7A:
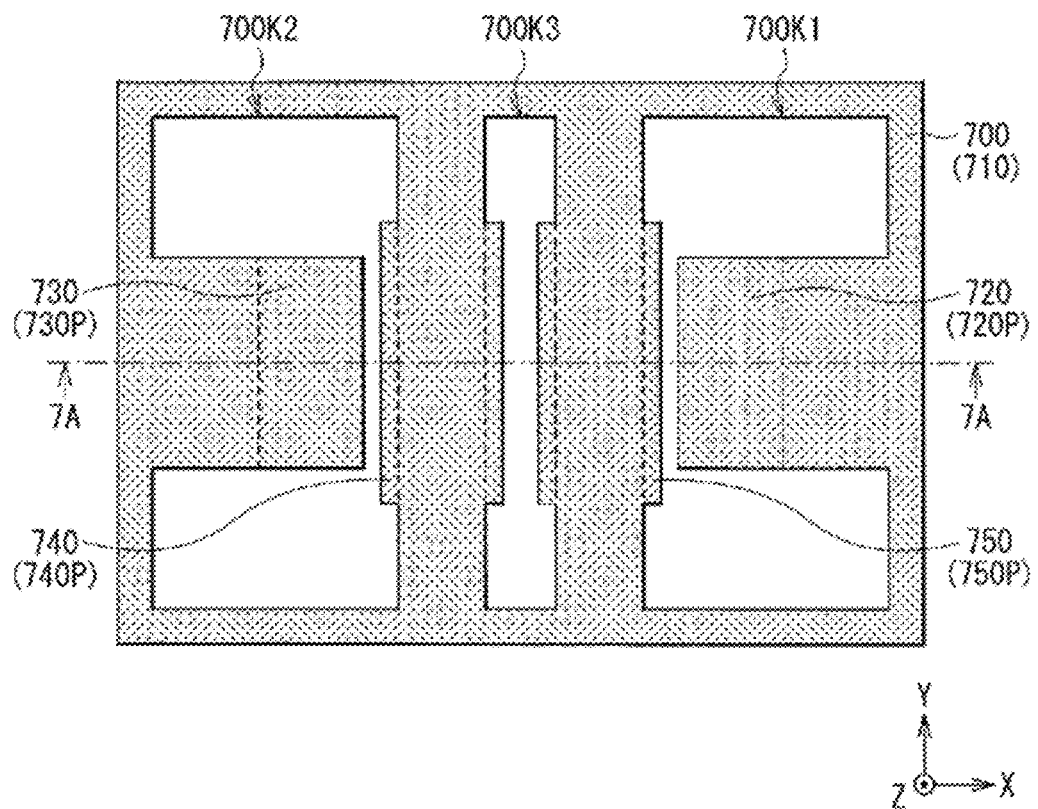
FIG. 7A is a plan view for describing a manufacturing process of the battery module of the embodiment of the present technology.
Figure 7B:
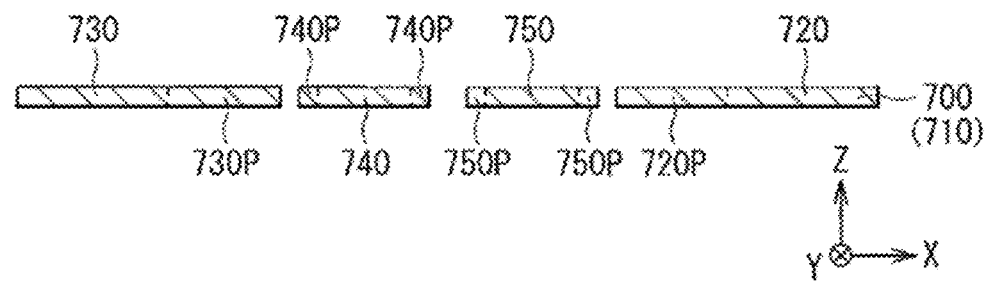
FIG. 7B is a sectional view illustrating the configuration of the battery module taken along line 7A-7A illustrated in FIG. 7A.
Figure 8A:
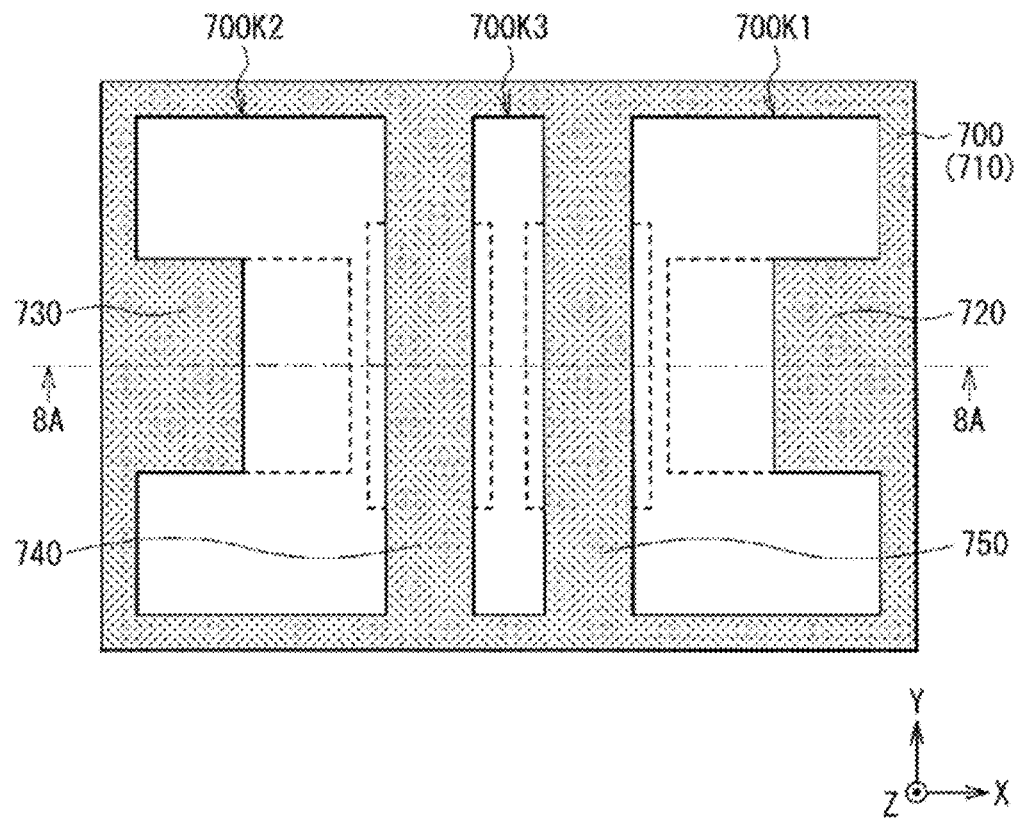
FIG. 8A is a plan view for describing the manufacturing process of the battery module following FIG. 7A.
Figure 8B:
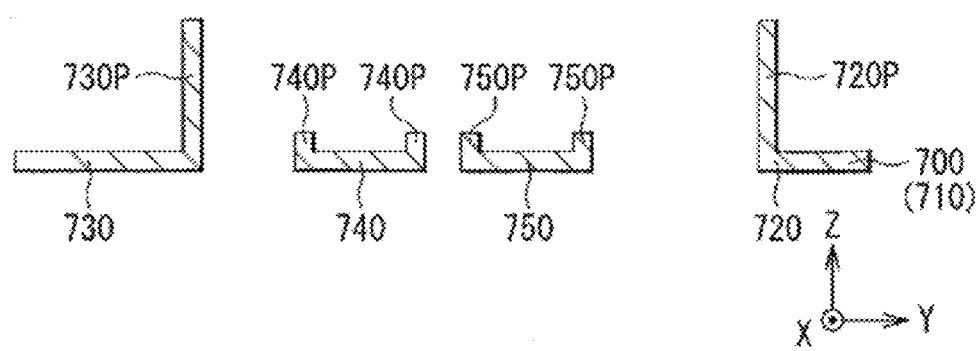
FIG. 8B is a sectional view illustrating the configuration of the battery module taken along line 8A-8A illustrated in FIG. 8A.
Figure 9A:
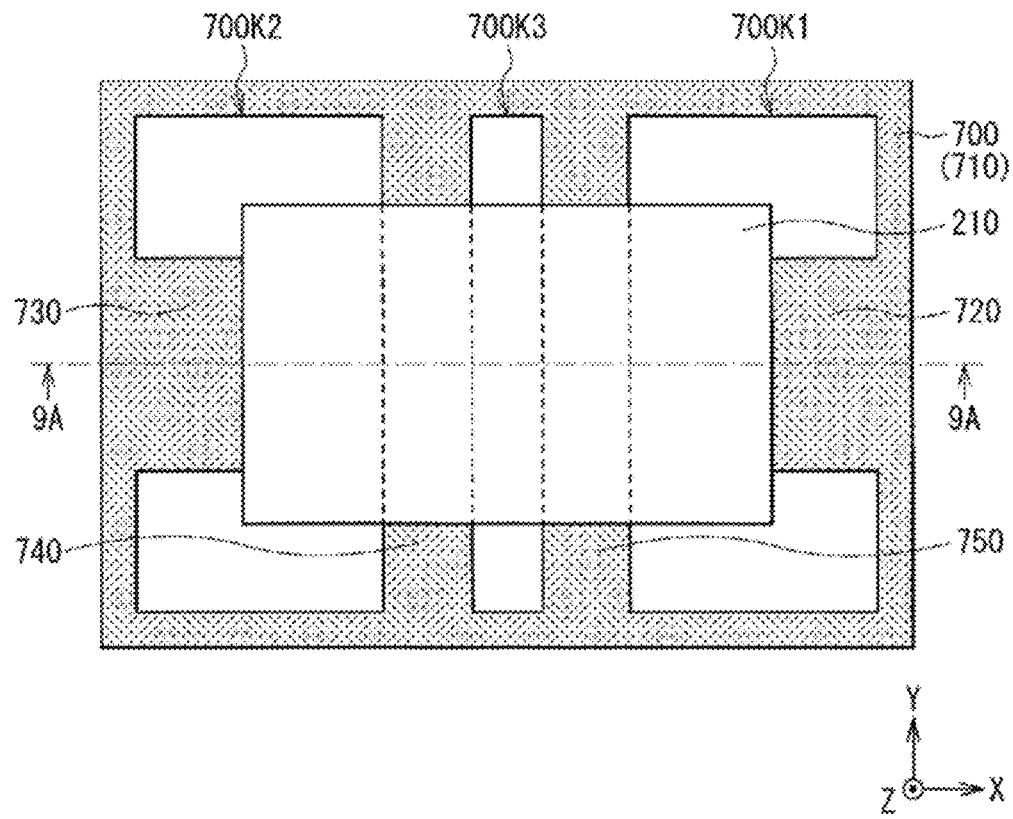
FIG. 9A is a plan view for describing the manufacturing process of the battery module following FIG. 8A.
Figure 9B:
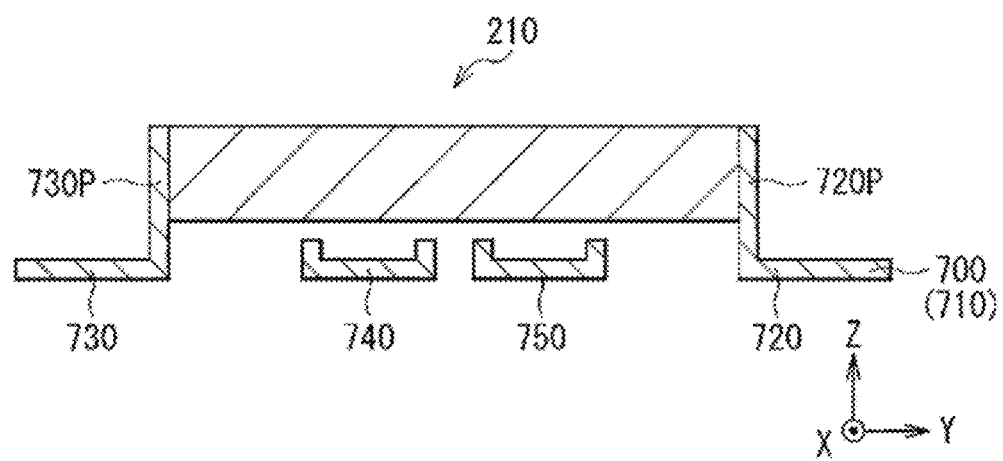
FIG. 9B is a sectional view illustrating the configuration of the battery module taken along line 9A-9A illustrated in FIG. 9A.
Figure 10A:
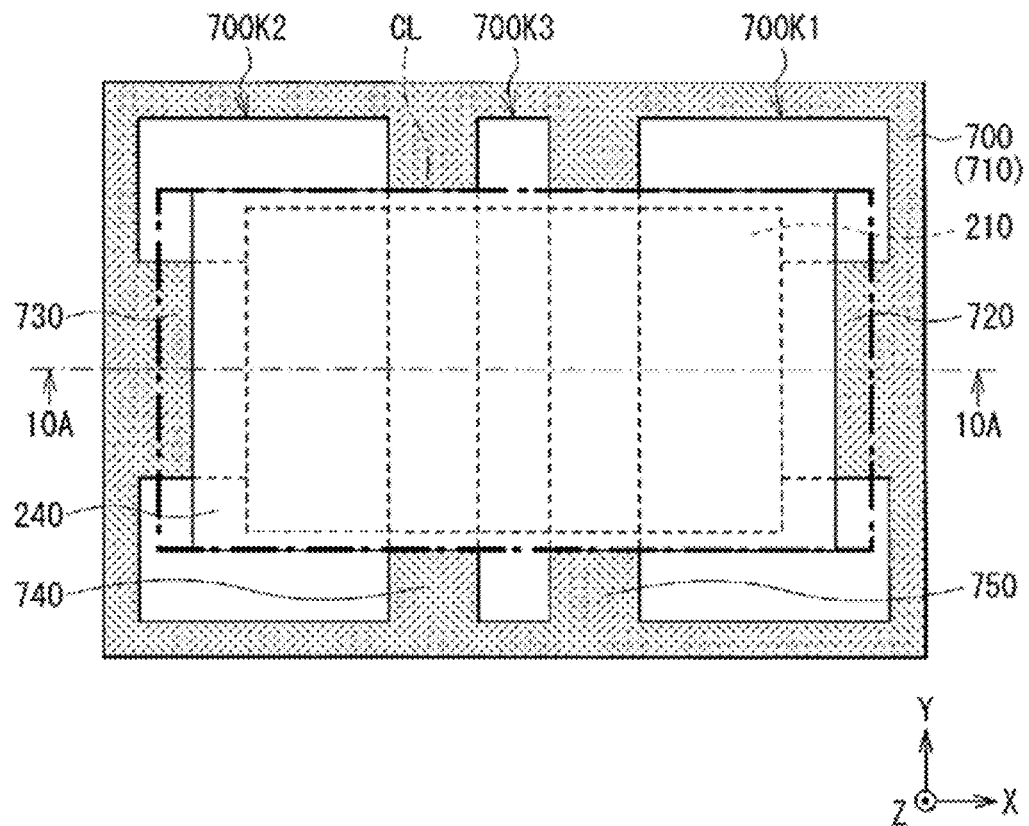
FIG. 10A is a plan view for describing the manufacturing process of the battery module following FIG. 9A.
Figure 10B:
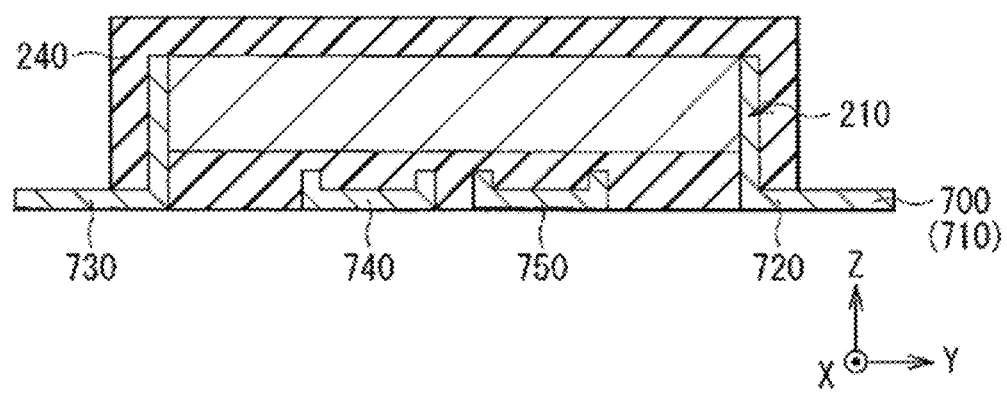
FIG. 10B is a sectional view illustrating the configuration of the battery module taken along line 10A-10A illustrated in FIG. 10A.
Figure 11A:
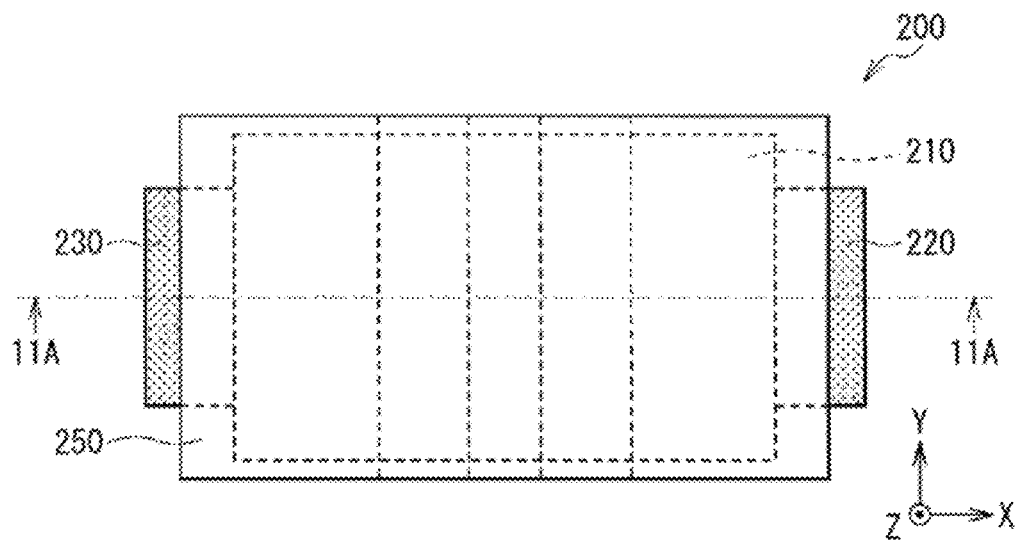
FIG. 11A is a plan view for describing the manufacturing process of the battery module following FIG. 10A.
Figure 11B:
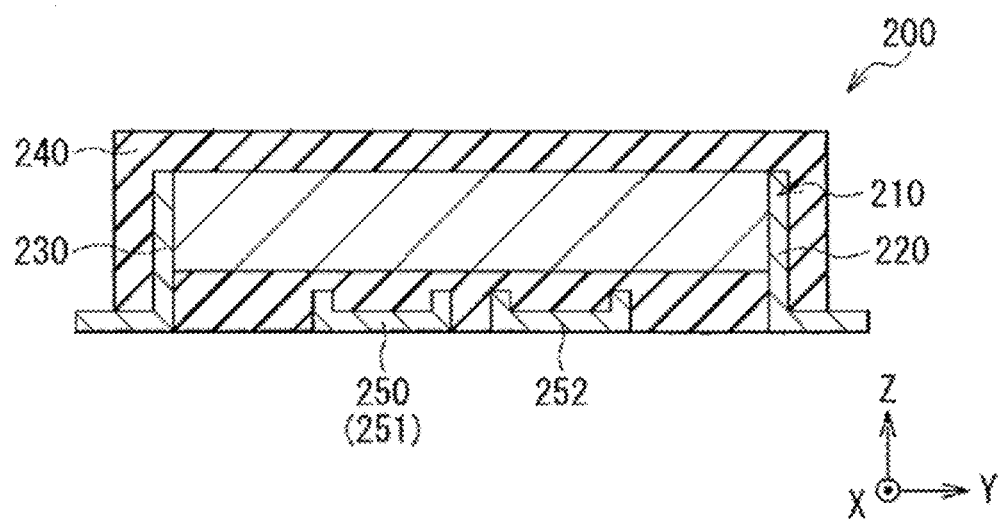
FIG. 11B is a sectional view illustrating the configuration of the battery module taken along line 11A-11A illustrated in FIG. 11A.

That is, FIG. 7B illustrates a section along line 7A-7A illustrated in FIG. 7A, FIG. 8B illustrates a section along line 8A-8A illustrated in FIG. 8A, FIG. 9B illustrates a section along line 9A-9A illustrated in FIG. 9A, FIG. 10B illustrates a section along line 10A-10A illustrated in FIG. 10A, and FIG. 11B illustrates a section along line 11A-11A illustrated in FIG. 11A.

[Manufacturing Method of Solid-State Battery]

Hereinafter, a manufacturing method of the solid electric body 200, which is a main part of the battery module illustrated in FIGS. 1 to 4, will be described. However, in FIGS. 9B, 10B, and 11B, the sectional configuration of the laminated body 210 is schematized in order to simplify the illustrated contents.

In order to manufacture the solid-state battery 200, first, the frame 700 is prepared as illustrated in FIGS. 7A and 7B. The frame 700 is a support used for manufacturing the battery module, and is a precursor that eventually becomes a part (positive electrode terminal 220, negative electrode terminal 230, and heat receiving pad 250) of the battery module. In FIG. 7A and FIGS. 8A, 9A, and 10A which are described later, the frame 700 is shaded.

Specifically, the frame 700 is, for example, a plate-shaped member having three openings 700K1, 700K2, and 700K3, and includes a frame portion 710, a pair of protruding portions 720 and 730, and a pair of crossing portions 740 and 750.

The frame portion 710 is a support frame that supports the pair of protruding portions 720 and 730 and the pair of crossing portions 740 and 750.

Each of the pair of protruding portions 720 and 730 is separated from each other with the pair of crossing portions 740 and 750 interposed in between in the X-axis direction. For example, the protruding portion 720 is connected to the frame portion 710 on one side (right side) in the X-axis direction, and protrudes inward from the frame portion 710. For example, the protruding portion 730 is connected to the frame portion 710 on the other side (left side) in the X-axis direction, and protrudes inward from the frame portion 710. Therefore, each of the protruding portions 720 and 730 protrudes in a direction approaching each other while extending in the X-axis direction, for example.

The protruding portion 720 includes, for example, a bent portion 720P that is to be bent in the post-process as a tip end portion in a protruding direction. Similarly, the protruding portion 730 includes, for example, a bent portion 730P that is to be bent in the post-process as a tip end portion in the protruding direction. In FIG. 7A, broken lines are added to the points where each of the protruding portions 720 and 730 is to be bent in the post-process.

The pair of crossing portions 740 and 750 are separated from each other in the X-axis direction. The crossing portion 740 is arranged, for example, closer to the protruding portion 730 than the protruding portion 720, and the crossing portion 750 is arranged, for example, closer to the protruding portion 720 than the protruding portion 730. For example, the crossing portion 740 is connected to the frame portion 710 on one end side (upper side) in the Y-axis direction, and is connected to the frame portion 710 on the other end side (lower side) in the Y-axis direction. For example, the crossing portion 750 is connected to the frame portion 710 on one end side in the Y-axis direction, and is connected to the frame portion 710 on the other end side in the Y-axis direction. Therefore, each of the crossing portions 740 and 750 extends in the Y-axis direction, for example.

The crossing portion 740 includes, for example, a pair of bent portions 740P that are to be bent in the post-process, as a pair of protruding portions protruding toward both sides (X-axis direction) at the central portion in the extending direction (Y-axis direction). Similarly, the crossing portion 750 includes, for example, a pair of bent portions 750P that are to be bent in the post-process, as a pair of protruding portions protruding toward both sides (X-axis direction) at the central portion in the extending direction (Y-axis direction). In FIG. 7A, broken lines are added to the points where each of the crossing portions 740 and 750 is to be bent in the post-process.

As a result, the opening 700K1 is surrounded by, for example, the frame portion 710, the protruding portion 720, and the crossing portion 750. The opening 700K2 is surrounded by, for example, the frame portion 710, the protruding portion 730, and the crossing portion 740. The opening 700K3 is surrounded by, for example, the frame portion 710 and the crossing portions 740 and 750.

The frame 700 includes, for example, the same material as the material for forming the heat receiving pad 250 (251, 252). Here, the frame 700 has conductivity because the frame 700 includes, for example, a nickel iron alloy (42 alloy). By manufacturing the solid-state battery 200 using the frame 700, each of the positive electrode terminal 220, the negative electrode terminal 230, and the heat receiving pad 250 (251, 252) is formed of a common material, as will be described later.

Subsequently, as illustrated in FIGS. 8A and 8B, a portion of each of the protruding portions 720 and 730 and the crossing portions 740 and 750 is bent in a direction common to each other.

Specifically, the bent portion 720P of the protruding portion 720 is bent toward the front side, and the bent portion 730P of the protruding portion 730 is bent toward the front side. Further, each of the pair of bent portions 740P of the crossing portion 740 is bent toward the front side, and each of the pair of bent portions 750P of the crossing portion 750 is bent toward the front side. This front side is a side located in front of the paper plane of FIG. 8A, and is the upper side in FIG. 8B. However, in FIG. 8A, illustration of the thickness of each of the protruding portions 720 and 730 (bent portions 720P and 730P) and the crossing portions 740 and 750 (bent portions 740P and 750P) is omitted.

Subsequently, as illustrated in FIGS. 9A and 9B, the laminated body 210 is formed above the frame 700, more specifically, on a side where each of the protruding portions 720 and 730 and the crossing portions 740 and 750 is bent.

Although detailed description of the manufacturing process of the laminated body 210 is omitted here, in a case where the laminated body 210 is formed, for example, the positive electrode layer 211 and the positive electrode separation layer 214, and the negative electrode layer 212 and the negative electrode separation layer 215 are alternately laminated with the solid electrolyte layer 213 interposed in between as illustrated in FIG. 4. In this case, for example, a so-called green sheet method is used.

In particular, in the case of forming the laminated body 210, the laminated body 210 is arranged between the protruding portions 720 and 730 (bent portions 720P and 730P), and the laminated body 210 is connected to each of the bent portions 720P and 730P. More specifically, the positive electrode layer 211 is connected to the bent portion 720P, and is separated from the bent portion 730P with the positive electrode separation layer 214 interposed in between. Further, the negative electrode layer 212 is connected to the bent portion 730P, and is separated from the bent portion 720P with the negative electrode separation layer 215 interposed in between.

Further, in the case of forming the laminated body 210, the laminated body 210 is arranged above each of the crossing portions 740 and 750 so that the laminated body 210 is separated from the crossing portions 740 and 750.

Subsequently, as illustrated in FIGS. 10A and 10B, the coating layer 240 is formed to cover the periphery of the laminated body 210. In the case of forming the coating layer 240, for example, a solution in which the material for forming the coating layer 240 (insulating polymer material) is dissolved by an organic solvent is supplied to the periphery of the laminated body 210, and then the solution is dried. In this case, the solution may be applied to the laminated body 210, or the laminated body 210 may be immersed in the solution.

In particular, in the case of forming the coating layer 240, each portion of the protruding portions 720 and 730 is led out from the inside of the coating layer 240 to the outside, and each of the crossing portions 740 and 750 is separated from the laminated body 210 with a portion of the coating layer 240 interposed in between.

A cutting line CL illustrated by the alternate long and short dash line in FIG. 10A represents the point where the frame 700 is cut in the post-process.

Finally, the frame 700 is cut along the cutting line CL illustrated in FIG. 10A, and then the frame 700 is removed. As a result, the solid-state battery 200 is completed as illustrated in FIGS. 11A and 11B. The detailed configuration of the solid-state battery 200 is as illustrated in FIGS. 1 to 4.

In this case, as is clear from FIGS. 10A, 10B, 11A and 11B, the positive electrode terminal 220 is formed by the protruding portion 720 after cutting, and the negative electrode terminal 230 is formed by the protruding portion 730 after cutting. Further, the heat receiving pad 251 is formed by the crossing portion 740 after cutting, and the heat receiving pad 252 is formed by the crossing portion 750 after cutting. As a result, the positive electrode terminal 220, the negative electrode terminal 230, and the heat receiving pad 250 (251, 252) are collectively formed.

[Manufacturing Method of Battery Module]

In the case of manufacturing the battery module, for example, as illustrated in FIG. 1, the solid-state battery 200, the heater 300, the wiring 400 (positive electrode wiring 401 and negative electrode wiring 402), and the heat transfer wire 500 (positive electrode heat transfer wire 501 and negative electrode heat transfer wire 502) are mounted on the surface of the substrate 100 by using the existing surface mount technology.

<1-6. Actions and Effects>

With this battery module, the solid-state battery 200 and the heater 300 are arranged on the substrate 100, and the solid-state battery 200 and the heater 300 are thermally connected to each other via the heat transfer wire 500 (positive electrode heat transfer wire 501 and negative electrode heat transfer wire 502). In this solid-state battery 200, the insulating coating layer 240 covers the laminated body 210 so that each of the positive electrode terminal 220 and the negative electrode terminal 230 is led out, and the heat receiving pad 250 (251, 252) is attached to the coating layer 240 so as to be electrically separated from each of the positive electrode terminal 220 and the negative electrode terminal 230. The thermal conductivity C (C1, C2) of the heat receiving pad 250 is higher than the thermal conductivity C5 of the coating layer 240.

In this case, since the heat generated in the heater 300 is transferred to the heat receiving pad 250 via the heat transfer wire 500, the laminated body 210 is heated by utilizing the heat transferred to the heat receiving pad 250. As a result, since the solid-state battery 200 is charged in a state where the laminated body 210 is heated, the solid-state battery 200 can be charged in a short time as compared with a case where the solid-state battery 200 is charged in a state where the laminated body 210 is not heated.

In particular, in a case where the laminated body 210 is heated by the heat receiving pad 250, since the thermal conductivity C of the heat receiving pad 250 is higher than the thermal conductivity C5 of the coating layer 240, the amount of heat received by the heat receiving pad 250 attached to the coating layer 240 is larger than the amount of heat released from the coating layer 240 that covers the laminated body 210. As a result, the laminated body 210 can be easily heated efficiently, so that the solid-state battery 200 is charged in a shorter time.

Moreover, since the heater 300, which is a heating source, is provided separately from the solid-state battery 200, the laminated body 210 can be heated by utilizing the heat receiving pad 250 by simply introducing the heat receiving pad 250 having a simple configuration into the solid-state battery 200. In this case, since it is not necessary to introduce a heating source having a complicated configuration into the solid-state battery 200, and it is also not necessary to introduce a complicated heat transfer mechanism in order to thermally connect the heating source and the solid-state battery 200, the solid-state battery 200 having the heating mechanism of the laminated body 210 is easily constructed.

Further, since each of the solid-state battery 200, the heater 300, and the heat transfer wire 500 is easily mounted on the substrate 100 by using the surface mount technology, the heating mechanism of the solid-state battery 200 using the heat transfer wire 500 together with the heater 300 is easily constructed.

Therefore, since the solid-state battery 200 can be charged in a short time by simply changing the configuration of the solid-state battery 200 in order to introduce the heat receiving pad 250, the charging characteristics of the battery module can be easily improved. In this case, since the solid-state battery 200 can be charged in a short time by a simple configuration change, the time required for charging the solid-state battery 200 can be shortened at low cost.

In particular, when the thermal conductivity C1 of the heat receiving pad 251 is equal to or higher than the thermal conductivity C3 of the positive electrode terminal 220 and equal to or higher than the thermal conductivity C4 of the negative electrode terminal 230, the amount of heat received by the heat receiving pad 251 is guaranteed. Therefore, the laminated body 210 can be easily heated efficiently, and thereby higher effects can be obtained. The actions and effects can be similarly obtained even in a case where the thermal conductivity C2 of the heat receiving pad 252 is equal to or higher than the thermal conductivity C3 of the positive electrode terminal 220 and equal to or higher than the thermal conductivity C4 of the negative electrode terminal 230.

In a case where the area S of the heat receiving surface 250M, that is, the sum (=S1+S2) of the area S1 of the heat receiving surface 251M and the area S2 of the heat receiving surface 252M is, for example, larger than the sum (=S3+S4) of the area S3 of the positive electrode terminal surface 220M and the area S4 of the negative electrode terminal surface 230M, the heat receiving area of the heat receiving pads 251 and 252 becomes larger than the heat radiation area of the positive electrode terminal 220 and the negative electrode terminal 230. Therefore, the laminated body 210 can be easily heated efficiently, and thereby higher effects can be obtained.

Further, in a case where the heat receiving pad 250 has an insulating property, the heat receiving pad 250 is electrically separated from each of the positive electrode terminal 220 and the negative electrode terminal 230. Therefore, an unintended short circuit of the solid-state battery 200 is less likely to occur, and thereby higher effects can be obtained.

Further, in a case where the heat receiving pad 250 has conductivity, the heat receiving pad 250 is electrically separated from the laminated body 210 with the insulating coating layer 240 interposed in between. Therefore, the laminated body 210 is less likely to be electrically affected, and thereby higher effects can be obtained. In this case, in particular, in the manufacturing process of the solid-state battery 200, since the positive electrode terminal 220, the negative electrode terminal 230, and the heat receiving pad 250 are collectively formed by using the conductive frame 700, the solid-state battery 200 can be easily manufactured.

Further, in a case where the heater 300 includes a chip resistor or the like, since the heater 300 can be easily mounted on the substrate 100, and the heater 300 can sufficiently heat the solid-state battery 200, higher effects can be obtained.

Further, in a case where the heat transfer wire 500 is the electric wiring for energization of the heater 300, it is not necessary to install electric wiring for energization separately from the heat transfer wire 500, and the heat transfer wire 500 can be easily mounted on the substrate 100 together with the solid-state battery 200 and the heater 300. Therefore, since the configuration of the battery module is further simplified by easily introducing the heat transfer wire 500, which functions as the heat transfer path and the conductive path, into the battery module, higher effects can be obtained. In this case, in particular, as described above, since the solid-state battery 200, the heater 300, and the heat transfer wire 500 can be mounted on the substrate 100 by using the surface mount technology, the battery module can be manufactured at low cost.

Further, with the solid-state battery 200 mounted on the battery module, the insulating coating layer 240 covers the laminated body 210 so that each of the positive electrode terminal 220 and the negative electrode terminal 230 is led out, the heat receiving pad 250 is attached to the coating layer 240 so as to be electrically separated from each of the positive electrode terminal 220 and the negative electrode terminal 230, and the thermal conductivity C of the heat receiving pad 250 is higher than the thermal conductivity C5 of the coating layer 240. In this case, for the reason described regarding the above-mentioned battery module, the charging time of the solid-state battery 200 can be shortened only by a simple configuration change in which the heat receiving pad 250 is introduced. Therefore, the charging characteristics of the battery module using the solid-state battery 200 can be easily improved. Other actions and effects relating to the solid-state battery 200 are the same as the actions and effects relating to the battery module.

Further, with the charging method of the solid-state battery 200, after the solid-state battery 200 is heated and the temperature T of the solid-state battery 200 is measured, charging of the solid-state battery 200 is started when the temperature T has reached the target temperature TA. In this case, as described above, since the solid-state battery 200 is charged in a state where the laminated body 210 is heated, the solid-state battery 200 is charged in a short time. Therefore, the charging characteristics of the battery module using the solid-state battery 200 can be easily improved.

2. Modification Example

The configuration of the battery module (solid-state battery 200) can be changed as appropriate. It should be noted that any two or more types of the mode relating to the configuration and operation of the battery module (solid-state battery 200) already described and a series of modes (modification examples) relating to the configuration and operation of the battery module (solid-state battery 200) described below may be combined with each other.

Modification Example 1

In FIGS. 1 to 4, the secondary battery includes two heat receiving pads 250 (251, 252), but the number of heat receiving pads 250 is not particularly limited. Therefore, the secondary battery may include only one heat receiving pad 250, or may include three or more heat receiving pads 250.

In a case where the secondary battery includes one heat receiving pad 250, for example, the heat receiving pad 250 may be connected to either the positive electrode heat transfer wire 501 or the negative electrode heat transfer wire 502. In a case where the secondary battery includes three or more heat receiving pads 250, two heat receiving pads 250 of the three or more heat receiving pads 250 may be connected to the positive electrode heat transfer wire 501 and the negative electrode heat transfer wire 502, and an additional heat transfer wire to connect the remaining one or more heat receiving pads 250 and the heater 300 to each other may be added. The configuration of this additional heat transfer wire is the same as the configuration of each of the positive electrode heat transfer wire 501 and the negative electrode heat transfer wire 502, for example.

Even in these cases, since the laminated body 210 is heated by utilizing one heat receiving pad 250 or three or more heat receiving pads 250, the same effects can be obtained.

Modification Example 2

Figure 12:
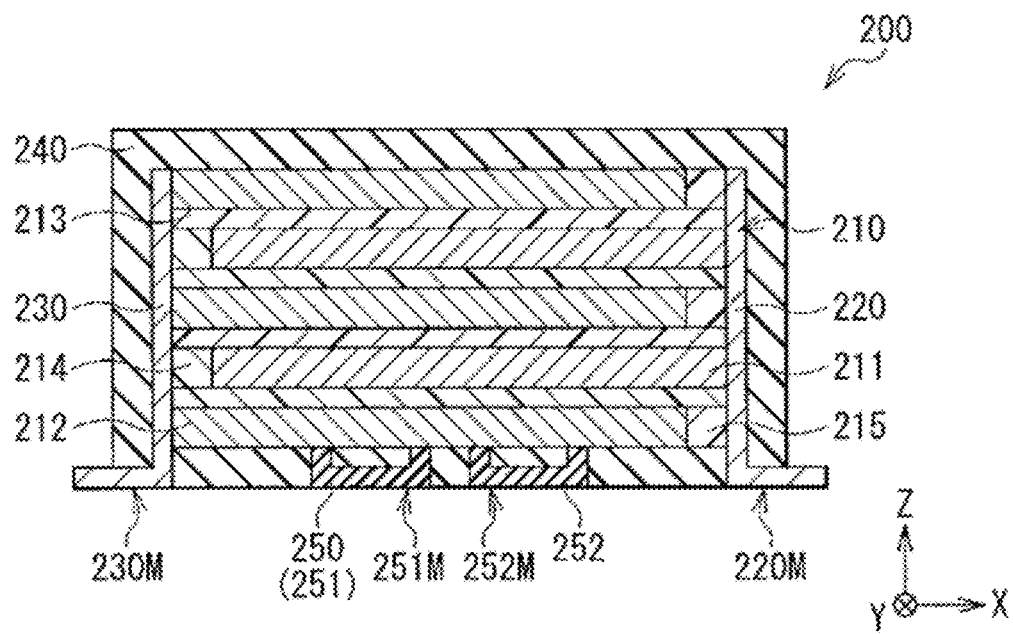
FIG. 12 is a sectional view illustrating a configuration of a solid-state battery of Modification Example 2.

In FIG. 4, the heat receiving pad 250 is separated from the laminated body 210 with the coating layer 240 interposed in between. However, for example, as illustrated in FIG. 12 corresponding to FIG. 4, as long as the heat receiving pad 250 has an insulating property, the heat receiving pad 250 may be adjacent to the laminated body 210.

Also in this case, since the laminated body 210 is heated by utilizing the heat receiving pad 250, the same effects can be obtained. In this case, in particular, since the heat receiving pad 250 is in the proximity of the laminated body 210, heat can be easily transferred from the heat receiving pad 250 to the laminated body 210. Therefore, the laminated body 210 is easily heated by utilizing the heat receiving pad 250.

Modification Example 3

In FIGS. 5 and 6, the battery module includes the temperature measuring element 605, and charging of the solid-state battery 200 is started when the temperature T has reached the target temperature TA on the basis of the measurement result of the temperature T of the solid-state battery 200 measured by the temperature measuring element 605.

However, if charging of the solid-state battery 200 is started when the solid-state battery 200 is heated until reaching a desired heating state, the logic for determining whether or not the solid-state battery 200 has reached the desired heating state is not particularly limited.

Figure 13:
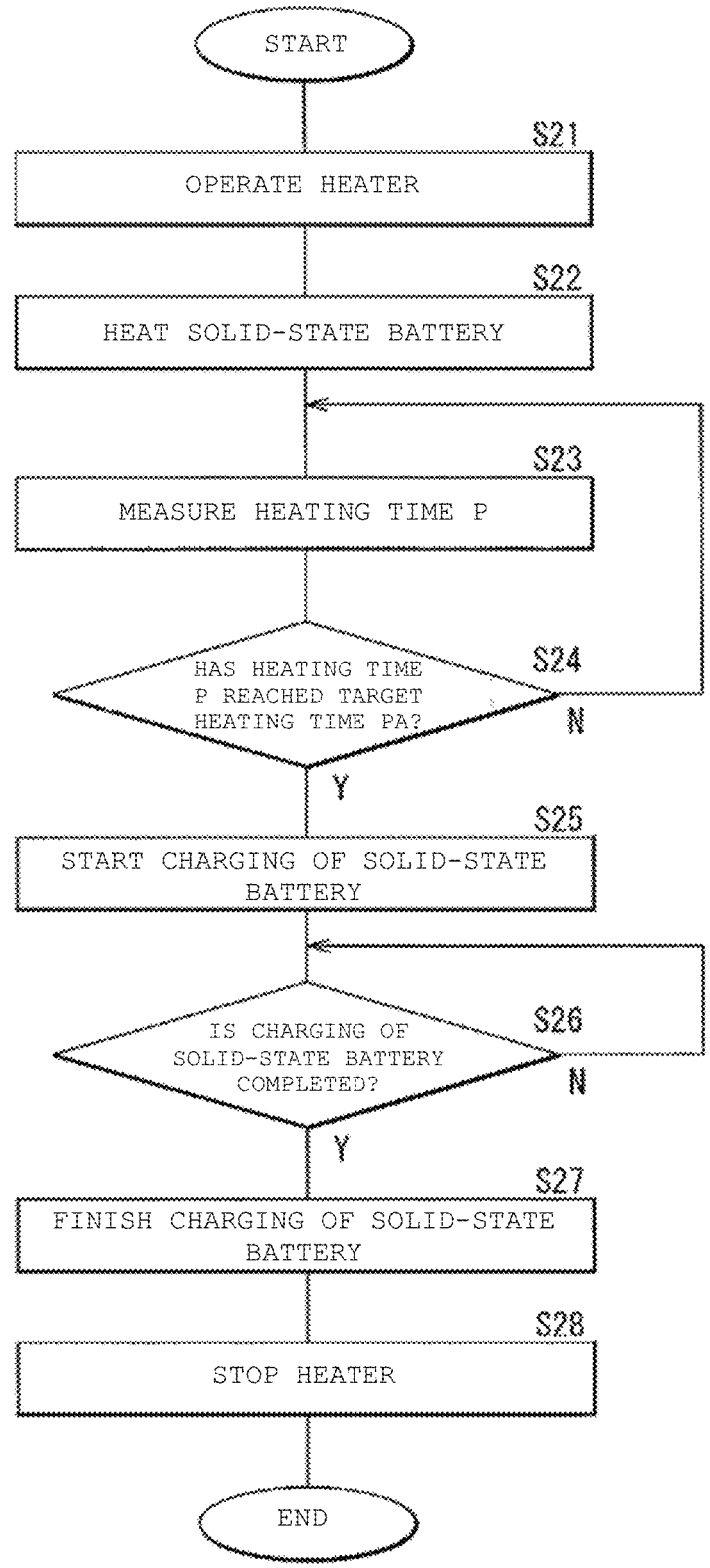
FIG. 13 is a flowchart for describing an operation of a battery module of Modification Example 3.

Specifically, for example, as illustrated in FIG. 13 corresponding to FIG. 6, charging of the solid-state battery 200 may be started on the basis of a measurement result of a heating time P of the solid-state battery 200 measured by the timer. In this case, for example, the battery module may not include the temperature measuring element 605.

The specific operation of the battery module is as described below. However, in the following description, the description of the same operation already described in FIG. 6 will be simplified.

At step S21, the heater 300 is operated and, at step S22, the solid-state battery 200 is heated. Subsequently, at step S23, the heating time (elapsed time after the start of heating) P of the solid-state battery 200 is measured via the timer. At step S24, whether or not the heating time P has reached a target heating time PA is determined on the basis of the measurement result of the heating time P. This target heating time PA is stored inside the memory, for example. In this case, the heating time is a heating attribute associated with the solid-state battery 200.

In a case where the heating time P has not reached the target heating time PA (step S24N), it is determined that the heating time has not elapsed to the extent that charging of the solid-state battery 200 can be started, and the process returns to the measurement operation of the heating time P at step S23. In this case, by measuring the heating time P again at the next measurement timing at step S23, the measurement operation of the heating time P and the determination operation at step S24 of the heating time P are repeated until the heating time P reaches the target heating time PA. When the heating time P reaches the target heating time PA, a charging prerequisite for initiating charging is met.

On the other hand, in a case where the heating time P has reached the target heating time PA (step S24Y), it is determined that the heating time has elapsed to the extent that charging of the solid-state battery 200 can be started, and charging of the solid-state battery 200 is started at step S25.

Here, the above-mentioned target heating time PA is the time for which the solid-state battery 200 is heated until the time required for charging can be shortened as compared with a case where the solid-state battery 200 is charged at room temperature (temperature=23° C.), and can be arbitrarily set according to a condition such as heating temperature.

Subsequently, whether or not the charging of the solid-state battery 200 is completed is determined at step S26. In a case where the charging of the solid-state battery 200 is not completed (step S26N), the determination on the charging completion is performed again at the next determination timing at step S26, and in a case where the charging of the solid-state battery 200 is completed (step S26Y), the charging of the solid-state battery 200 is finished at step S27.

Finally, the heater 300 is stopped at step S28. As a result, the solid-state battery 200 is charged, so that the charging operation of the solid-state battery 200 is completed.

In this case, after the solid-state battery 200 is heated and the heating time P of the solid-state battery 200 is measured, charging of the solid-state battery 200 is started when the heating time P has reached the target heating time PA. Therefore, since the solid-state battery 200 is charged in a state where the laminated body 210 is heated, the same effects can be obtained.

Modification Example 4

Figure 14:
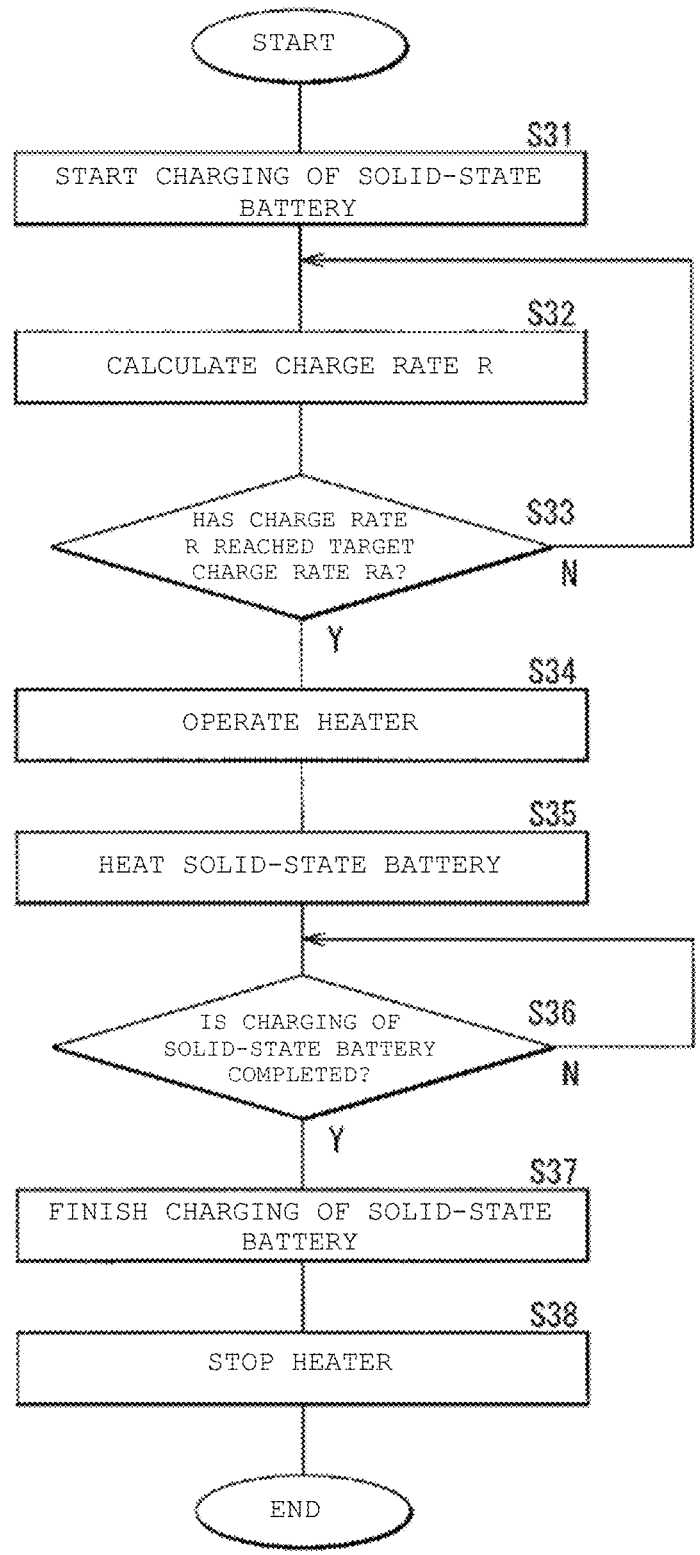
FIG. 14 is a flowchart for describing an operation of a battery module of Modification Example 4.

In FIGS. 6 and 13, after the solid-state battery 200 is heated using the heater 300, charging of the solid-state battery 200 is started when a predetermined condition regarding each of the temperature T and the heating time P is satisfied. However, for example, as illustrated in FIG. 14 corresponding to FIGS. 6 and 13, after charging of the solid-state battery 200 is started, the solid-state battery 200 may be heated using the heater 300 when a predetermined condition regarding a charge rate R of the solid-state battery 200 is satisfied.

The specific operation of the battery module is as described below. However, in the following description, the description of the same operation as that already described in FIG. 6 will be simplified.

At step S31, charging of the solid-state battery 200 is started. At step S32, the charge rate R of the solid-state battery 200 is calculated via the voltage/current adjusting unit 603. In this case, the charge rate R is calculated by dividing the integrated current after the start of charging, which is measured via the voltage/current adjusting unit 603, by the capacity of the solid-state battery 200. That is, the charge rate R is calculated on the basis of a formula of charge rate R=integrated current after the start of charging/capacity of the solid-state battery 200. In this case, the charge rate is an electrical attribute of the solid-state battery 200.

At step S33, a determination is made on whether the charge rate R has reached a target charge rate RA is determined on the basis of the calculation result of the charge rate R (step S33). This target charge rate RA is stored inside the memory, for example. If the charge rate R matches the target charge rate RA, a heating prerequisite for initiating heating of the solid-state battery 200 is satisfied.

Here, the above-mentioned target charge rate RA is a charge rate that requires shortening of the charging time of the solid-state battery 200 as compared with a case where the solid-state battery 200 is charged at room temperature (temperature=23° C.). Specifically, in the charging process of the solid-state battery 200, in general, the charging speed tends to become significantly slow when the charge rate becomes equal to or higher than a certain value, that is, at the end of charging. Therefore, in order to effectively shorten the charging time of the solid-state battery 200, even if the solid-state battery 200 is not heated in the entire charging process, it is possible to effectively shorten the time required for charging the solid-state battery 200 at the end of charging as long as the solid-state battery 200 is heated at the end of charging in which the charging speed tends to become significantly slow. Therefore, the target charge rate RA is a charge rate at the end of charging in which the charging time needs to be significantly shortened by heating the solid-state battery 200 because the charging time becomes significantly long in a state where the solid-state battery 200 is not heated. As described above, the specific target charge rate RA is not particularly limited as long as the target charge rate RA is a charge rate at the end of charging, but is, for example, 80% or more.

In a case where the charge rate R has not reached the target charge rate RA (step S33N), it is determined that the charging process has not reached the end of charging in which heating of the solid-state battery 200 is required, and the process returns to the calculation operation at step S32 of the charge rate R. In this case, by calculating the charge rate R again at the next calculation timing at step S32, the calculation operation at step S32 of the charge rate R and the determination operation at step S33 of the charge rate R are repeated until the charge rate R reaches the target charge rate RA.

On the other hand, in a case where the charge rate R has reached the target charge rate RA (step S33Y), it is determined that the charging process has reached the end of charging in which heating of the solid-state battery 200 is required. As a result, the heater 300 is operated at step S34, and the solid-state battery 200 is heated at step S35.

At step S36, a determination is made on whether charging of the solid-state battery 200 is completed. In a case where the charging of the solid-state battery 200 is not completed (step S36N), the determination on the charging completion is performed again at the next determination timing at step S36, and in a case where the charging of the solid-state battery 200 is completed (step S36Y), the charging of the solid-state battery 200 is finished at step S37.

Finally, the heater 300 is stopped at step S38. As a result, the solid-state battery 200 is charged and the charging operation of the solid-state battery 200 is complete.

In this case, after charging of the solid-state battery 200 is started and the charge rate R of the solid-state battery 200 is calculated, the solid-state battery 200 is heated when the charge rate R has reached the target charge rate RA. Therefore, since the solid-state battery 200 is charged in a state where the laminated body 210 is heated, the same effects can be obtained.

As a result, in particular, since the laminated body 210 is heated only at the end of charging in which the charging speed becomes significantly slow, the time for which the laminated body 210 is heated is shortened as compared with a case where the laminated body 210 is heated in the entire charging process (FIGS. 6 and 13). Therefore, since deterioration of the laminated body 210 (material for forming each layer such as the solid electrolyte layer 213) due to heating is suppressed and the amount of energy consumed for the heating operation of the heater 300 is reduced, higher effects can be obtained. In particular, by suppressing deterioration of the laminated body 210, it is also possible to suppress that the charging speed becomes slow due to the deterioration of the laminated body 210.

Modification Example 5

Figure 15:
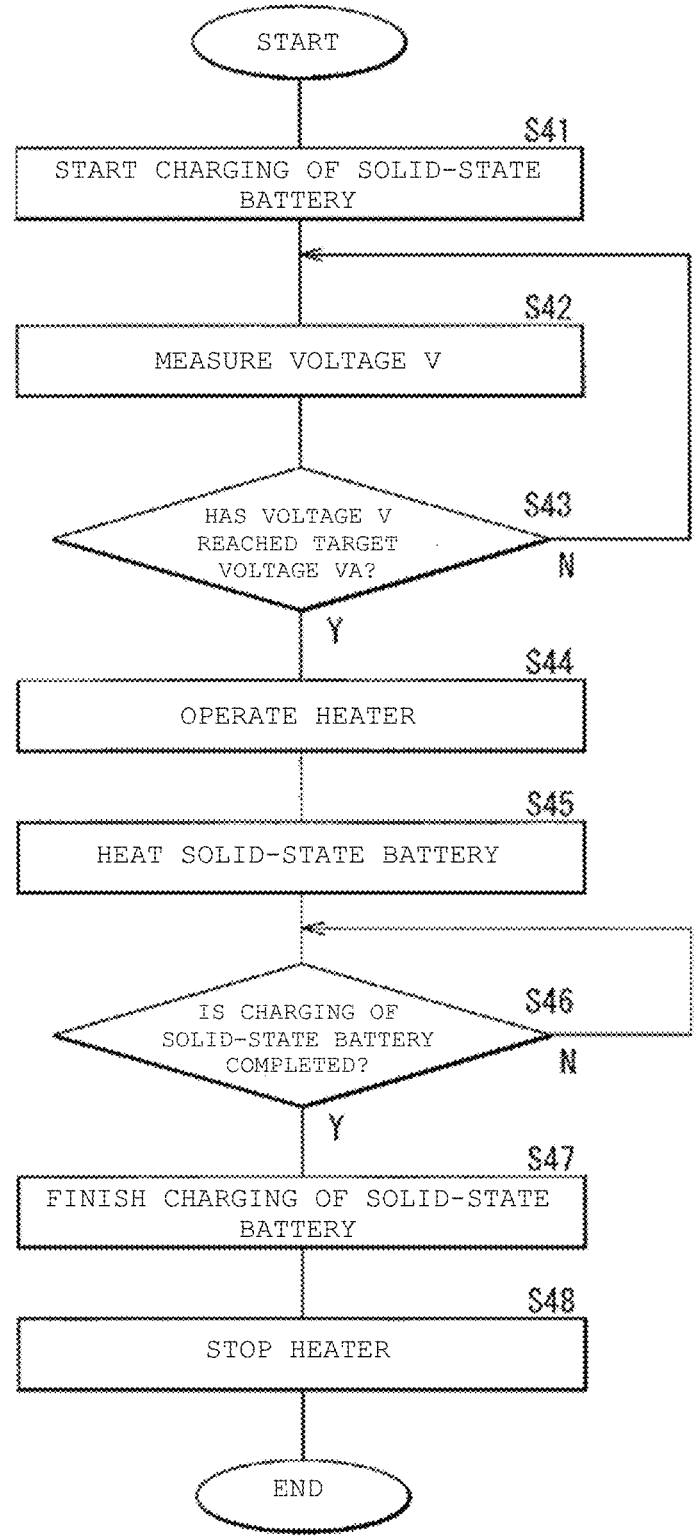
FIG. 15 is a flowchart for describing an operation of a battery module of Modification Example 5.

Further, for example, as illustrated in FIG. 15 corresponding to FIG. 14, after charging of the solid-state battery 200 is started, the solid-state battery 200 may be heated using the heater 300 when a predetermined condition regarding a voltage V of the solid-state battery 200 is satisfied.

The specific operation of the battery module is as described below. However, in the following description, the description of the same operation as that already described in FIG. 6 will be simplified.

At step S41, charging of the solid-state battery 200 is started. At step S42, the voltage V of the solid-state battery 200 is measured via the voltage/current adjusting unit 603. In this case, the voltage V is the electrical attribute of the solid-state battery 200.

At step S43, a determination is made on whether the voltage V has reached a target voltage VA on the basis of the measurement result of the voltage V. The target voltage VA is a voltage corresponding to the above-mentioned target charge rate RA (refer to FIG. 14), that is, a voltage at the end of charging, and is stored inside the memory, for example. If the voltage V matches the target voltage VA, a heating prerequisite for initiating heating of the solid-state battery 200 is satisfied. The specific target voltage VA is not particularly limited as long as the target voltage VA is a voltage at the end of charging. For example, when converted to the voltage in a case where the positive electrode active material is lithium cobalt oxide ($LiCoO_2$) and the negative electrode active material is graphite, the target voltage VA is, for example, equal to or higher than 4.1V.

In a case where the voltage V has not reached the target voltage VA (step S43N), it is determined that the charging process has not reached the end of charging in which heating of the solid-state battery 200 is required, and the process returns to the measurement operation at step S42 of the voltage V. In this case, by calculating the voltage V again at the next measurement timing at step S42, the calculation operation at step S42 of the voltage V and the determination operation at step S43 of the voltage V are repeated until the voltage V reaches the target voltage VA.

On the other hand, in a case where the voltage V has reached the target voltage VA (step S43Y), it is determined that the charging process has reached the end of charging in which heating of the solid-state battery 200 is required. As a result, the heater 300 is operated at step S44, and the solid-state battery 200 is heated at step S45.

At step S46, a determination is made on whether the charging of the solid-state battery 200 is complete. In a case where the charging of the solid-state battery 200 is not completed (step S46N), the determination on the charging completion is performed again at the next determination timing at step S46, and in a case where the charging of the solid-state battery 200 is completed (step S46Y), the charging of the solid-state battery 200 is finished at step S47.

Finally, the heater 300 is stopped at step S48. As a result, the solid-state battery 200 is charged and the charging operation of the solid-state battery 200 is complete.

In this case, after charging of the solid-state battery 200 is started and the voltage V of the solid-state battery 200 is measured, the solid-state battery 200 is heated when the voltage V has reached the target voltage VA. Therefore, since the solid-state battery 200 is charged in a state where the laminated body 210 is heated, the same effects can be obtained.

Even in this case, since the laminated body 210 is heated only at the end of charging in which the charging speed becomes significantly slow, similar to the case where the determination is performed on the basis of the charge rate R (FIG. 14), deterioration of the laminated body 210 due to heating is suppressed, and the amount of energy consumed by the heater 300 is reduced Modification Example 6

In FIG. 1, the battery module includes one solid-state battery 200 and one heater 300, but the number of each of solid-state batteries 200 and heaters 300 is not particularly limited, and may be two or more.

Figure 16:
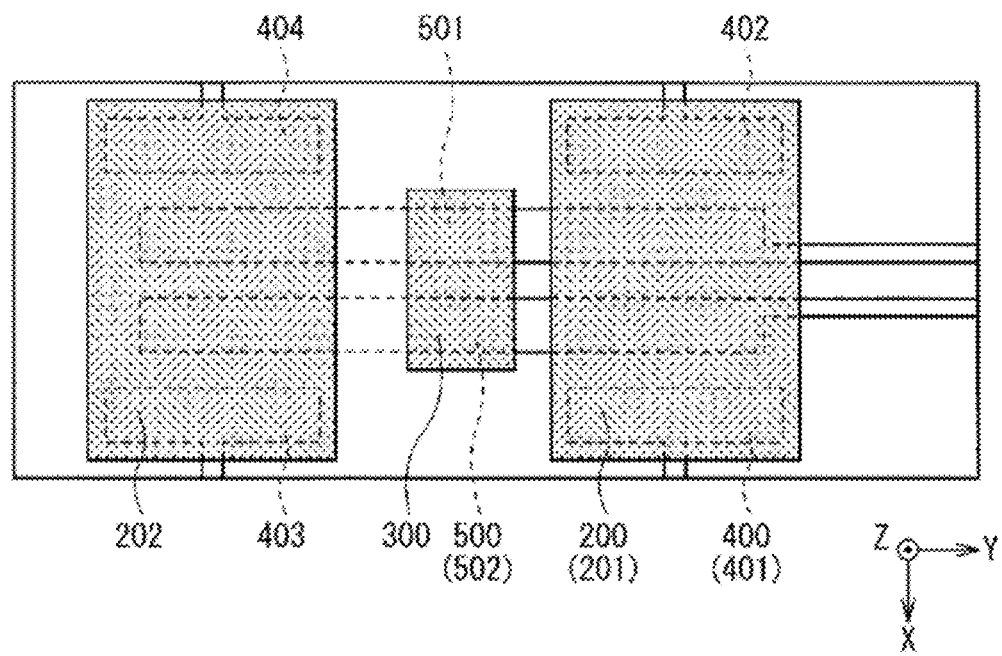
FIG. 16 is a plan view illustrating a configuration of a battery module of Modification Example 6.

Specifically, for example, as illustrated in FIG. 16 corresponding to FIG. 1, the battery module may include two solid-state batteries 200 (201, 202). The battery module has the same configuration as that of the battery module illustrated in FIG. 1 except that the battery module includes, for example, positive electrode wiring 403 and negative electrode wiring 404 together with two solid-state batteries 201 and 202, and an extension range of each of the positive electrode heat transfer wire 501 and the negative electrode heat transfer wire 502 is different. In FIG. 16, each of the solid-state batteries 201 and 202 is shaded.

The solid-state batteries 201 and 202 are separated from each other with the heater 300 interposed in between in the Y-axis direction, for example. The configuration of each of the solid-state batteries 201 and 202 is as illustrated in FIGS. 1 to 4, for example.

In the solid-state battery 201, for example, the positive electrode terminal 220 is connected to the positive electrode wiring 401, and the negative electrode terminal 230 is connected to the negative electrode wiring 402. In the solid-state battery 202, for example, the positive electrode terminal 220 is connected to the positive electrode wiring 403, and the negative electrode terminal 230 is connected to the negative electrode wiring 404. The configurations of the positive electrode wiring 403 and the negative electrode wiring 404 are the same as the configurations of the positive electrode wiring 401 and the negative electrode wiring 402, respectively.

Each of the positive electrode heat transfer wire 501 and the negative electrode heat transfer wire 502 extends from the solid-state battery 201 to the solid-state battery 202 via the heater 300. As a result, in the solid-state battery 201, the heat receiving pad 251 is connected to the positive electrode heat transfer wire 501, and the heat receiving pad 252 is connected to the negative electrode heat transfer wire 502. In the solid-state battery 202, the heat receiving pad 251 is connected to the positive electrode heat transfer wire 501, and the heat receiving pad 252 is connected to the negative electrode heat transfer wire 502.

In the battery module, when the heater 300 generates heat, the heat generated in the heater 300 is transferred to the solid-state battery 201 (heat receiving pads 251 and 252) via the positive electrode heat transfer wire 501 and the negative electrode heat transfer wire 502, and is transferred to the solid-state battery 202 (heat receiving pads 251 and 252) via the positive electrode heat transfer wire 501 and the negative electrode heat transfer wire 502. As a result, in the solid-state battery 201, the laminated body 210 is heated by the heat receiving pads 251 and 252, and also in the solid-state battery 202, the laminated body 210 is heated by the heat receiving pads 251 and 252.

In this case, the battery module includes a plurality of solid-state batteries 200 (here, two solid-state batteries 201 and 202), and the heater 300 is thermally connected to the plurality of solid-state batteries 200 via the heat transfer wire 500 (positive electrode heat transfer wire 501 and negative electrode heat transfer wire 502). As a result, since the solid-state battery 200 (laminated body 210) is heated by utilizing the heat receiving pad 250, the same effects can be obtained.

In particular, since one heater 300 is shared by the plurality of solid-state batteries 200, the plurality of solid-state batteries 200 are heated using the one heater 300. As a result, since it is not necessary to use a plurality of heaters 300 to heat the plurality of solid-state batteries 200, the number of required heaters 300 is reduced. Thus, a plurality of solid-state batteries 200 can be charged while suppressing the mounting area of the heater 300 or the like on the substrate 100, and therefore higher effects can be obtained. In particular, since the number of heaters 300 is only one, the configuration of the battery module can be simplified and the cost increase can be suppressed.

3. Application of Battery Module (Solid-State Battery)

The application of the battery module is not particularly limited. Since the solid-state battery 200 is a constituent of the battery module as described above, the application of the solid-state battery 200 will be described below.

The application of the battery module is not particularly limited as long as the battery module is applied to machines, apparatuses, appliances, devices, and systems (aggregation of a plurality of apparatuses and the like) that can utilize the battery module as a power supply for driving and a power storage source for power storage.

The battery module used as a power supply may be a main power supply or an auxiliary power supply. The main power supply is a power supply that is preferentially used regardless of the presence or absence of another power supply. The auxiliary power supply may be, for example, a power supply used in place of the main power supply, or a power supply that can be switched from the main power supply as needed. In a case where the battery module is used as an auxiliary power supply, the type of the main power supply is not limited to the battery module.

The application of the battery module is as follows, for example. There are electronic devices (including portable electronic devices) such as video cameras, digital still cameras, mobile phones, laptop computers, cordless phones, headphone stereos, portable radios, portable TVs, and portable information terminals. There are portable household appliances such as electric shavers. There are storage devices such as a backup power supply and a memory card. There are power tools such as electric drills and electric saws. There are battery packs installed in laptop computers as a removable power supply. There are medical electronic devices such as pacemakers and hearing aids. There are electric vehicles such as electric cars (including hybrid cars). There are power storage systems such as household battery systems that store power in case of an emergency. Of course, as the application of the battery module, there may be other applications other than the above-mentioned applications.

Although the present technology has been described above with reference to one embodiment, the mode of the present technology is not limited to the modes described in the one embodiment, and thus can be variously modified. Specifically, the solid-state battery using lithium as the electrode reactant has been described, but a solid-state battery using an electrode reactant other than lithium may be used.

Since the effects described in the present specification are merely examples, the effects of the present technology are not limited to the effects described in the present specification. Therefore, other effects regarding the present technology may be obtained.

The invention claimed is:

1. A solid-state battery comprising:
    a battery element including alternating positive electrode layers and negative electrode layers each separated by a respective solid electrolyte layer interposed in between;
    a positive electrode terminal that is attached to the battery element and electrically connected to the positive electrode layers and electrically separated from the negative electrode layers;
    a negative electrode terminal that is attached to the battery element and electrically connected to the negative electrode layers and electrically separated from the positive electrode layers;
    an insulating coating that covers the battery element, wherein a respective portion of each of the positive electrode terminal and the negative electrode terminal lead out of the covered battery element; and
    a heat receiving member embedded in the insulating coating so as to be partially exposed and separated from the battery element such that the insulating coating is interposed between the battery element and the heat receiving member, and electrically separated from both the positive electrode terminal and the negative electrode terminal, wherein a thermal conductivity of the heat receiving member is higher than a thermal conductivity of the insulating coating.

2. The solid-state battery according to claim 1, wherein the thermal conductivity of the heat receiving member is:
    (1) equal to or higher than a thermal conductivity of the positive electrode terminal, and
    (2) equal to or higher than a thermal conductivity of the negative electrode terminal.

3. The solid-state battery according to claim 1, wherein the heat receiving member has a heat receiving surface along a predetermined surface,
    the positive electrode terminal has a positive electrode terminal surface along the predetermined surface,
    the negative electrode terminal has a negative electrode terminal surface along the predetermined surface, and
    an area of the heat receiving surface is greater than a sum of an area of the positive electrode terminal surface and an area of the negative electrode terminal surface.

4. The solid-state battery according to claim 1, wherein the heat receiving member has an insulating property.

5. The solid-state battery according to claim 1, wherein the heat receiving member has conductivity.

6. The solid-state battery according to claim 1, further comprising negative electrode separation layers that electrically separate the positive electrode terminal from the negative electrode layers.

7. The solid-state battery according to claim 1, further comprising positive electrode separation layers that electrically separate the negative electrode terminal from the positive electrode layers.

8. A battery module comprising:
a support;
a solid-state battery arranged on the support, wherein the solid-state battery comprises:
  a battery element including alternating positive electrode layers and negative electrode layers each separated by a respective solid electrolyte layer interposed in between;
  a positive electrode terminal that is attached to the battery element to be electrically connected to the positive electrode layers and electrically separated from the negative electrode layers;
  a negative electrode terminal that is attached to the battery element to be electrically connected to the negative electrode layers and electrically separated from the positive electrode layers;
  an insulating coating that covers the battery element, wherein a respective portion of each of the positive electrode terminal and the negative electrode terminal lead out of the covered battery element; and
  a heat receiving member embedded in the insulating coating so as to be partially exposed and separated from the battery element such that the insulating coating is interposed between the battery element and the heat receiving member, and electrically separated from both the positive electrode terminal and the negative electrode terminal, wherein a thermal conductivity of the heat receiving member is higher than a thermal conductivity of the insulating coating;
a heating source arranged on the support at a position different from a position where the solid-state battery is arranged; and
a heat transfer member, arranged on the support, that is thermally connected to the solid-state battery and the heating source.

9. The battery module according to claim 8, wherein the heating source includes at least one of a chip resistor and a positive characteristic thermistor.

10. The battery module according to claim 8, wherein the heat transfer member is electric wiring for energizing the heating source.

11. The battery module according to claim 8, further comprising a plurality of the solid-state batteries including the solid-state battery, wherein the heating source is thermally connected to the plurality of solid-state batteries via the heat transfer member.

12. A method for charging a solid-state battery, the method comprising:
providing a solid-state battery that includes:
  a battery element including alternating positive electrode layers and negative electrode layers each separated by a respective solid electrolyte layer interposed in between;
  a positive electrode terminal that is attached to the battery element and electrically connected to the positive electrode layers and electrically separated from the negative electrode layers;
  a negative electrode terminal that is attached to the battery element and electrically connected to the negative electrode layers and electrically separated from the positive electrode layers;
  an insulating coating that covers the battery element, wherein a respective portion of each of the positive electrode terminal and the negative electrode terminal lead out of the covered battery element; and
  a heat receiving member embedded in the insulating coating so as to be partially exposed and separated from the battery element such that the insulating coating is interposed between the battery element and the heat receiving member, and electrically separated from both the positive electrode terminal and the negative electrode terminal, wherein a thermal conductivity of the heat receiving member is higher than a thermal conductivity of the insulating coating;
heating the solid-state battery via the heat receiving member that is embedded in the insulating coating covering the battery element of the solid-state battery;
measuring a heating attribute of the solid-state battery;
determining whether the heating attribute of the solid-state battery meets a charging prerequisite for initiating charging the solid-state battery; and
in response to determining that the heat attribute meets the charging prerequisite, charging the solid-state battery.

13. The method of claim 12, wherein the heating attribute is a temperature and the charging prerequisite is for the temperature to match a predetermined temperature appropriate for charging the solid-state battery.

14. The method of claim 12, wherein the heating attribute is a heating time and the charging prerequisite is for the heating time to match a predetermined heating time appropriate for charging the solid-state battery.

15. The method of claim 12, further comprising:
measuring an electrical attribute of the solid-state battery;
determining whether the electrical attribute meets a heating prerequisite for initiating heating of the solid-state battery; and
in response to determining that the electrical attribute meets the heating prerequisite, heating the solid-state battery.

16. The method of claim 15, wherein the electrical attribute is a charge rate and the heating prerequisite is for the charge rate to match a predetermined charge rate appropriate for heating the solid-state battery.

17. The method of claim 15, wherein the electrical attribute is a voltage and the heating prerequisite is for the voltage to match a predetermined voltage appropriate for heating the solid-state battery.

18. The method of claim 12, wherein a thermal conductivity of the heat receiving member is higher than a thermal conductivity of the insulating coating.

* * * * *